(12) United States Patent
Kundu

(10) Patent No.: US 12,233,915 B2
(45) Date of Patent: Feb. 25, 2025

(54) ALLOCATING RESOURCES FOR A VEHICLE

(71) Applicant: HITACHI, LTD., Tokyo (JP)

(72) Inventor: Subrata Kumar Kundu, Canton, MI (US)

(73) Assignee: HITACHI, LTD., Tokyo (JP)

( * ) Notice: Subject to any disclaimer, the term of this patent is extended or adjusted under 35 U.S.C. 154(b) by 366 days.

(21) Appl. No.: 17/867,817

(22) Filed: Jul. 19, 2022

(65) Prior Publication Data
US 2024/0025453 A1 Jan. 25, 2024

(51) Int. Cl.
*G01C 21/00* (2006.01)
*B60W 60/00* (2020.01)

(52) U.S. Cl.
CPC ..... *B60W 60/0027* (2020.02); *B60W 2556/65* (2020.02)

(58) Field of Classification Search
None
See application file for complete search history.

(56) References Cited

U.S. PATENT DOCUMENTS

| | | | | |
|---|---|---|---|---|
| 11,703,347 B2* | 7/2023 | Robert | G05D 1/0274 701/450 |
| 11,972,616 B2* | 4/2024 | Mayster | G01C 21/3602 |
| 11,987,266 B2* | 5/2024 | Watts | B60W 50/023 |
| 12,078,993 B2* | 9/2024 | Nagarajan | G05D 1/648 |
| 2017/0219364 A1* | 8/2017 | Lathrop | G01C 21/36 |
| 2017/0314954 A1* | 11/2017 | Golding | G01C 21/3644 |
| 2017/0356746 A1* | 12/2017 | Lagnemma | G01C 21/3461 |
| 2017/0356747 A1* | 12/2017 | Lagnemma | G01C 21/3461 |
| 2017/0356748 A1* | 12/2017 | Lagnemma | G01C 21/34 |
| 2018/0005525 A1* | 1/2018 | Parundekar | H04L 67/12 |
| 2018/0066960 A1* | 3/2018 | Tateishi | G05D 1/0274 |
| 2018/0266833 A1* | 9/2018 | Carlson | G01C 21/3815 |
| 2018/0292833 A1* | 10/2018 | You | G05D 1/0274 |
| 2019/0049259 A1* | 2/2019 | Galan-Oliveras | G05D 1/0088 |
| 2019/0080266 A1* | 3/2019 | Zhu | G05D 1/0223 |
| 2019/0113353 A1* | 4/2019 | Shimizu | B60W 50/082 |
| 2019/0120640 A1* | 4/2019 | Ho | G01C 21/3492 |
| 2019/0205990 A1* | 7/2019 | Hsu-Hoffman | G06Q 40/08 |
| 2020/0174470 A1* | 6/2020 | Park | G08G 1/09685 |
| 2020/0200552 A1* | 6/2020 | Sood | G01C 21/3415 |

(Continued)

*Primary Examiner* — Jonathan M Dager
(74) *Attorney, Agent, or Firm* — MATTINGLY & MALUR, PC

(57) ABSTRACT

In some examples, a system may determine a plurality of candidate routes between a source location and a destination location for a vehicle, and may segment each candidate route into multiple road segments. Further, the system may receive vehicle computing resource information and sensor configuration information for the vehicle. The system may determine that at least one of the sensor configuration or the computing resources on board the vehicle fails to satisfy a threshold associated with autonomous navigation of a road segment of a first candidate route of the plurality of candidate routes. The system may select, for the vehicle, the first candidate route based at least on determining that a computing device external to the vehicle is scheduled to perform at least one computational task for the vehicle to enable the vehicle to meet the threshold associated with autonomously navigating the road segment of the first candidate route.

14 Claims, 17 Drawing Sheets

(56) References Cited

U.S. PATENT DOCUMENTS

| | | | |
|---|---|---|---|
| 2020/0218256 A1* | 7/2020 | Mcnew | G01C 21/3415 |
| 2021/0048825 A1* | 2/2021 | Elvitigala | B60W 60/0023 |
| 2021/0146944 A1* | 5/2021 | Kundu | B60W 50/085 |
| 2021/0381845 A1* | 12/2021 | Gokhale | G01C 21/3691 |
| 2022/0065644 A1* | 3/2022 | Kundu | G01C 21/3446 |
| 2023/0080281 A1* | 3/2023 | Kundu | G06N 5/022 |
| | | | 701/410 |

* cited by examiner

ALLOCATING RESOURCES FOR A VEHICLE

BACKGROUND

Advanced driver assistance systems (ADAS) and autonomous driving (AD) systems are systems that automate or otherwise enhance vehicle control for improved safety, automated navigation, improved convenience, improved efficiency, and the like. Conventionally, vehicles that are only partially automated are equipped with a limited number of sensors and processors to keep costs down and provide these vehicles with greater market acceptance. Increasing the level of automated driving to semi-autonomous or fully autonomous requires the inclusion of multiple different types of sensors on a vehicle to continuously monitor the surroundings of the vehicle. Further, these semi-autonomous or fully autonomous vehicles typically need to process all this sensor data in real time, such as to recognize obstacles and perform other navigation functions. However, processing large amounts of sensor data from multiple different types of sensors in real time can require large amounts of processing capacity, which can substantially increase the cost of a vehicle.

SUMMARY

In some implementations, a system may determine a plurality of candidate routes between a source location and a destination location for a vehicle, and may segment each candidate route into multiple road segments. Further, the system may receive vehicle computing resource information and sensor configuration information for the vehicle. The system may determine that at least one of the sensor configuration or the computing resources on board the vehicle fails to satisfy a threshold associated with autonomous navigation of a road segment of a first candidate route of the plurality of candidate routes. The system may select, for the vehicle, the first candidate route based at least on determining that a computing device external to the vehicle is scheduled to perform at least one computational task for the vehicle to enable the vehicle to meet the threshold associated with autonomously navigating the road segment of the first candidate route.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DESCRIPTION

Figure 1:
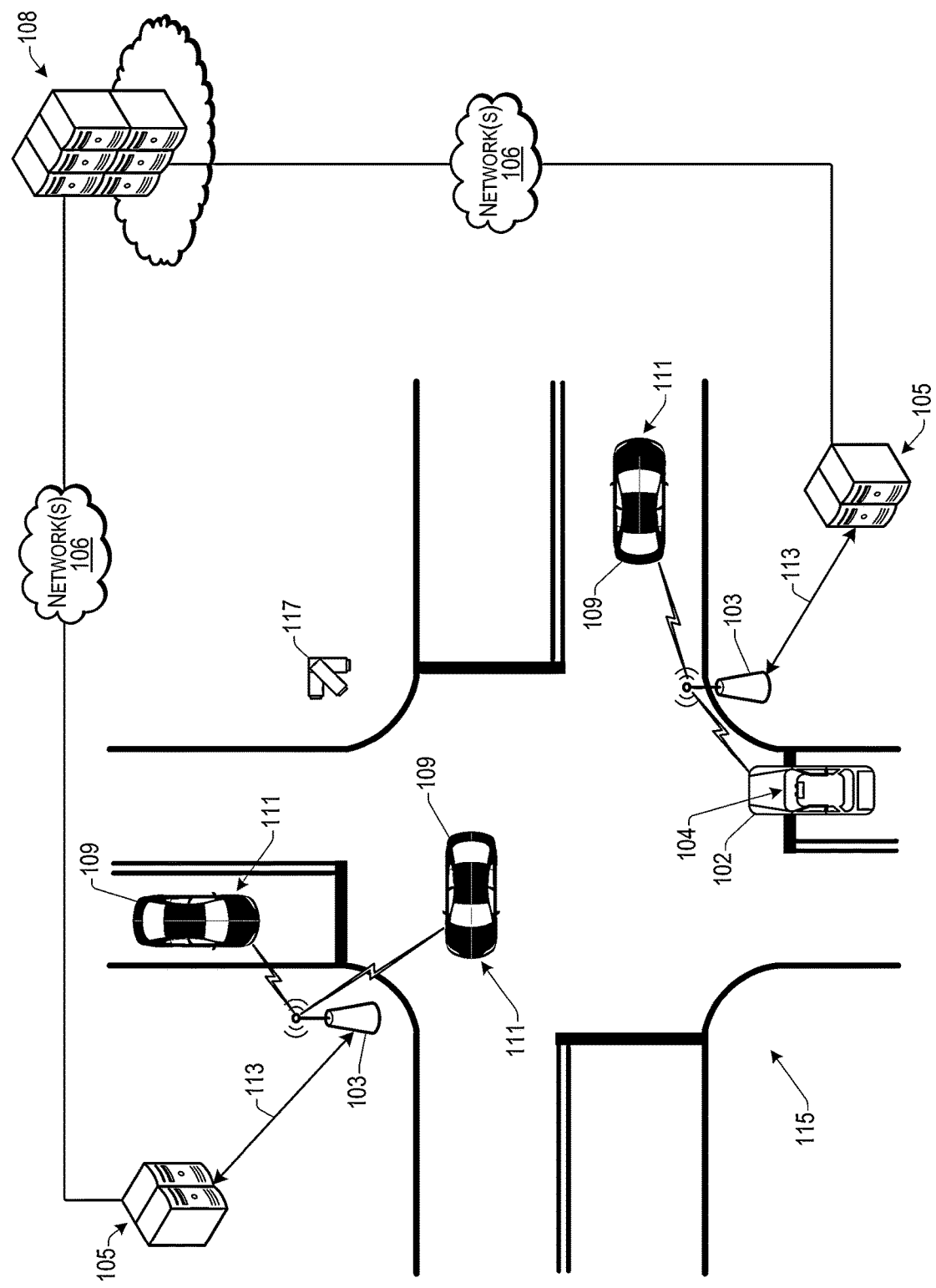
FIG. 1 illustrates an example system for allocation of resources for a vehicle according to some implementations.

Some implementations herein are directed to techniques and arrangements for allocating resources for a vehicle, such as an autonomous driving (AD) vehicle or ADAS vehicle. Some implementations herein are able to identify computational resources available to a vehicle along a route that the vehicle is expected to traverse. The determination of available computational resources may include computational resources that are expected to be available on board the vehicle, and may also include other computational resources external to the vehicle that may be utilized by the vehicle while traversing the route. In addition, the examples herein may allocate computational tasks of the vehicle effectively in advance of the vehicle reaching expected locations along the route to maximize the amount of time that the vehicle is able to perform autonomous driving. This may help increase the safety of the vehicle by increasing the amount of time that the vehicle safely operates autonomously, as opposed to being operated by a human or being operated autonomously with insufficient sensor data processing.

Examples herein may include calculation of a precautionary observation zone (POZ) that may be used for determining an optimal route for a vehicle. The determination of the POZ may take into consideration the types and capabilities of onboard sensors employed on the vehicle when selecting the optimal route, and may further take into consideration road features on each candidate route, the field of view (FOV) necessary for navigating each candidate route, as well as other considerations, as discussed below.

In some cases, the anticipated computational tasks at each location along a route may be determined based at least in part on determining the POZs along the route that the vehicle is expected to traverse. For example, in the case that a certain zone along the route will require a larger amount of sensor resources and/or computational resources (e.g., more resources than are available onboard the vehicle), the system herein may identify any task-offloading regions along the route in advance, and may effectively assign one or more of the anticipated sensing and/or recognition tasks to available computing resources that may be located along the route. Thus, some examples may determine in advance the computationally demanding zones along a selected route, and may designate these zones as locations at which sensing-task offloading, computational-task offloading, and/or computational task sharing may be desirable for the vehicle.

In some examples, the system herein may offload the sensing and computational tasks to one or more vehicular edge computing devices (VECs) that may be located near the route and able to communicate with nearby vehicles through one or more roadside units. For instance, in contrast to communications with computing devices at data centers or other cloud infrastructure locations, the VECs herein may be better positioned to execute time-critical computational tasks due to the closer location of processing units to the roadside, as compared to the relatively remote location of cloud-based servers. For example, VECs may avoid or substantially reduce the network latency of data communications between the vehicle and off-vehicle computing devices. Furthermore, other vehicles with available sensing and computational resources that are near a VEC may provide the sensing and/or computational resources to the VEC to also process and/or provide data to the vehicle.

Examples herein may provide a combination of VECs, other vehicles with excess computational capacity, and more remotely located cloud-based service computing devices, which separately and/or together may provide sensing and computation resources to respective vehicles in need of additional computational resources, while the respective vehicles also perform onboard processing using their own electronic control units (ECUs) and their own onboard sensors. Accordingly, implementations herein are able to solve the issue of vehicles that may have insufficient sensing and/or computational resources for a desired level of automated driving at all locations along a particular route. For instance, the examples herein may determine in advance where to request that a nearby VEC provide support with sensing and/or computational tasks for a vehicle that is not able to fully sense a POZ for one or more road segments being traversed by the vehicle. For example, the remotely located service computing devices may assign the computational task to a nearby VEC according to the available computation resources on the VEC. Implementations herein may further identify certain regions along the route in advance as POZs, which are locations that may require higher levels of computational resources to realize autonomous driving, The system may perform scheduling for assigning and executing the offloaded computational tasks accordingly by scheduling available computation resources of the VECs and/or the cloud-based service computing devices.

As mentioned above, safe driving is not only important for individuals but also for any type of transportation or service business. Safety is one of the underlying reasons for wider development and rapid progress of automated driving systems. Fully or partially automated vehicles are equipped with multiple sensors to continuously monitor the vehicle surroundings to recognize obstacles for improving safety. Prior studies show that most road accidents are caused due to human driver errors. Thus, state of the art automated vehicles equipped with advanced sensing and data processing units may enable the use of improved algorithms to significantly reduce the incidence of vehicle collisions.

The sensors of the automated vehicles herein may play a major role in detecting obstacles around the vehicles and road features to ultimately help avoid collisions. The processing units herein may process the sensor data in real time utilizing state of the art algorithms and may send necessary control signals to various systems and/or actuators to control the vehicle. By deploying multiple redundant high-resolution sensors around the vehicle in conjunction with use of multiple processing units with high processing capacity, a vehicle may be able to operate autonomously in all conditions. However, such a configuration not only increases the cost of the vehicle substantially, but can also reduce the vehicle efficiency. Accordingly, to address these issues, implementations herein may use a more limited number of sensors and processing units with optimized processing capacities. Using a limited number of sensors may be sufficient for many automated driving scenarios, but in other cases, the limited number of sensors may not be sufficient to sense all of the regions necessary for safely navigating a particular road segment, intersection, or the like. Consequently, implementations herein may employ VECs to augment the sensing capabilities of a vehicle at these locations, such as by using sensing information obtained from infrastructure sensors, other vehicle sensors, or other sensors external to the vehicle that may be available in the vicinity. In some cases, the VEC may process the external sensor data on behalf of the vehicle to provide the sensing results to the vehicle to assist the vehicle in autonomous driving.

To ensure the safety of a vehicle, some examples herein may try to maximize the amount of automated driving time. However, in some situations, a vehicle with a limited number of sensors cannot assure continuous automated driving for an entire route when considering some types of road categories and road geometries. For example, a vehicle equipped with a front camera and radar can generally ensure autonomous driving on highways; however, this sensor combination is not sufficient for performing automated driving in urban areas. Therefore, utilization of infrastructure and/or other vehicle sensors as connected data may be employed in some examples herein for automated driving. However, processing these extra data also requires additional computational resources. With the recent advancements in connectivity and cloud computing, VECs and central cloud-based computation techniques are utilized in some examples herein for providing additional information to a vehicle. However, because remote cloud-based computing resources (e.g., the service computing devices herein) are generally deployed at data centers that may be geographically remote from the vehicle, there may be significant delays in communications between the service computing devices and the vehicle such that time critical applications cannot be performed and returned to the vehicle in a sufficient short enough time to ensure vehicle safety.

In some examples herein, at the beginning of a trip, the vehicle may share its current location, destination, sensor types and configuration, and processing unit specifications with the service computing devices. The service computing devices identify candidate routes to the destination and calculate POZs for the candidate routes. The POZ may be a region that a vehicle should monitor to ensure safety of the vehicle. POZs may be determined for all the road segments/waypoints during the route. A POZ may be a 3D region that varies depending e.g., the road type, waypoint locations, etc., as discussed additionally below.

The service computing devices may analyze vehicle sensor configuration and processing unit specifications in comparison with the POZs identified along all the candidate road segments, and select the optimal route for maximizing the amount of time for automated driving. Based on the vehicle sensor configuration and vehicle processing unit specifications, the service computing devices may identify the road segments along the route where the vehicle requires additional computational resources to analyze sensor data, such as for identifying road features and obstacles for automated driving. The service computing devices share the vehicle information with the VECs in the identified locations and the expected time at which the vehicle is expected to approach the road segment nearest to the respective VEC. Upon receiving the vehicle information from the service computing devices, the respective VEC may analyze the scheduled computing tasks for that time segment, and based on the computing resource availability of the respective VEC, may confirm or reject the request to support the particular vehicle. Additionally, based on the feedback from the respective VECs, the service computing devices may update the routing information and may send the routing information to the vehicle. For instance, if a VEC is not able to support the request for the particular vehicle, the service computing devices may determine whether an alternative candidate route may be available for the vehicle. The techniques described herein for computational task distribution and offloading performed in advance, while taking into consideration, the vehicle onboard processing units, the VEC capacity availability, and service computing device availability may provide significant benefits for maximizing the time of automated driving of an autonomous or semi-autonomous vehicle and for ensuring the safety thereof.

In some examples, the vehicle may access a connected data analytics platform provided by the service computing devices and may provide information to the data analytics platform on the service computing devices regarding the onboard sensors available on the vehicle, as well as providing a source location, a destination location, vehicle configuration information, and so forth. Further, the vehicle may receive, from the data analytics platform, information about one or more optimal routes selected by the data analytics platform for reaching the destination location. Alternatively, in other examples, the route determination may be performed by a computing device onboard the vehicle, or by a VEC located proximate to the vehicle, along a route of the vehicle, or the like.

Implementations herein may determine a plurality of POZs for each candidate route. For instance, each candidate route may be divided into a plurality of segments, and a POZ and computational requirements may be calculated for each segment. The calculated POZ(s) and computational requirements may be used to determine the overall feasibility of each candidate route and a particular candidate route may be selected for the vehicle to traverse to a selected destination based at least in part on the computational requirements and the ability to meet them. For example, it may be desirable to maximize the amount of time that will be allocated to autonomous driving along a route to improve overall safety of the vehicle and its passengers (e.g., most traffic accidents are caused by human error, so increasing autonomous driving time when it can be done safely can increase the overall safety of the vehicle). Further, by determining a POZ for each road segment, the system herein is able to determine in advance a zone that the vehicle should monitor to ensure safety of the vehicle when traversing the respective road segment.

As one example, the POZ for a road segment may be determined using a camera-based driver monitoring system and data collected from monitoring a number of subjects. However, some examples herein included techniques for determining POZs by identifying the required observation zones for a route without prior subject-based driver monitoring data. In these techniques, a fully automated/semi-automated vehicle may communicate with a data analytics platform provided by the service computing devices that may determine a plurality of candidate destination routes, such as by using a conventional routing engine. In the data analytics platform, potential routes are divided into multiple road segments and each road segment is categorized as to whether it is a part of an intersection functional area or not. Based on the category of the selected road segment, multiple parameters including stopping sight distance, perception reaction distance, maneuver distance, turn sight distance, etc., are calculated which are ultimately used to calculate the POZ for that road segment.

For discussion purposes, some example implementations are described in the environment of selecting a vehicle route (travel path) for a vehicle based on the determination of one or more POZs for a selected route, and further based on vehicle onboard processing capabilities, and processing availability of one or more VECs along the candidate route. However, implementations herein are not limited to the particular examples provided, and may be extended to other types of vehicles, other types of communications, other types of computing device configurations, other types of computing platforms and architectures, and so forth, as will be apparent to those of skill in the art in light of the disclosure herein.

FIG. 1 illustrates an example system 100 for allocation of resources for a vehicle according to some implementations. In this example, at least three different types of computational resources may be employed. The system 100 includes a vehicle 102 having one or more vehicle computing devices 104 able to communicate wirelessly with one or more roadside units (RSUs) 103 that are connected to one or more VECs 105. In addition, the vehicle computing devices 104 and the VECs 105 are able to communicate over one or more networks 106 with one or more service computing devices 108. The VECs 105 may also communicate with a plurality of other vehicles 109, each of which may also include its own vehicle computing devices 111. In some examples herein, the vehicles 102, 109 may be referred to as "connected vehicles" since they are connected for communication with one or more off-vehicle computing devices, such as the VECs 105 and/or the service computing devices 108.

As several non-limiting examples, the VECs 105 may be near to a road segment, such as by being located within a mile, a half mile, a quarter mile, or less from one or more of the road segments traversed by the vehicles 102, 109 to which the VECs 105 provide recognition data or other results of processing the sensor data from the sensors external to (i.e., not on board) the vehicle 102. For instance, in some cases, the VECs 105 may be located within several hundred yards of the RSUs 103 to which they are connected, and the RSUs 103 may be located within several dozen yards of the roads on which the vehicles 102, 109 travel. Conversely, the service computing devices 108 may be located dozens, hundreds, or even thousands of miles from the RSUs 103, the vehicles 102, 109, and the VECs 105.

The one or more networks 106 may include any appropriate network, including a wireless network, such as a cellular network; a wide area network, such as the Internet; a local area network, such an intranet; a local wireless network, such as Wi-Fi; close-range wireless communications, such as BLUETOOTH® or DSRC (dedicated short-range communications); a wired network, including fiber optics and Ethernet; any combination of the foregoing, or any other suitable communication network. Components used for such communication technologies can depend at least in part upon the type of network, the environment selected, or both. Protocols for communicating over such networks are well known and will not be discussed herein in detail.

Additionally, communication links 113 between the RSUs 103 and the VECs 105 may include any of the one or more networks 106. For example, the VECs 105 and the RSUs 103 may communicate through wireless or wired communications. In some cases, the communication links 113 may include an optical fiber connection, Ethernet, or other wired connections. Further, the RSUs 103 may be configured to communicate wirelessly with the vehicles 102, 109, such as through any type of wireless communications. Examples include 4G, 5G, or LTE cellular communications, other radio frequencies, Wi-Fi communications, other short range radio communications, or any other wireless communication technology.

In some examples, the vehicle computing devices 104, 111, may include one or more electronic control units (ECUs) or any of various other types of computing devices. For instance, the computing devices 104, 111 may include one or more ADAS/AD ECUs or other types of ECUs for processing sensor data and for controlling at least some of the vehicle systems, such as to perform ADAS and/or AD tasks, such as navigation, braking, steering, acceleration, deceleration, and so forth. The computing devices 104, 111 may also include one or more other ECUs, such as for controlling any of numerous other systems of the vehicles 102, 109, respectively.

In the illustrated example, an intersection 115 includes multiple RSUs 103 able to communicate with the vehicles 102, 109. For instance, suppose that a data analytics platform implemented by the service computing devices 108 has identified the intersection 115 as a POZ at which the vehicle 102 may require additional computational resources for navigating. In addition, there may be one or more infrastructure sensors 117 located at the intersection 117, such as traffic cameras, or any of various other types of sensors.

Accordingly, a portion of the computational tasks to enable the vehicle 102 to navigate the intersection 115 autonomously may be offloaded to one of the VECs 105 that are located proximate to the intersection 115 and able to communicate with the RSUs 103, respectively. For example, infrastructure sensor data, data from other vehicles 109, and/or data from the vehicle 102 may be received by the VEC 105. The VEC 105 may perform one or more computational tasks on behalf of the vehicle 102, and may send the results of the processing to the vehicle 102 through the RSU 103. The vehicle 102 may use the results provided by the VEC 105 during navigation of the intersection 115. As one example, the VEC 105 may compensate for limited sensor capabilities of the vehicle 102 by augmenting the sensed information of the vehicle 102 with sensor information from the infrastructure sensors and/or other vehicle sensors.

For example, at the beginning of a trip, the vehicle 102 may share its destination with the one or more service computing devices 108. Based on the destination, the service computing device 108 may select an optimal route, as discussed additionally below, and which may include determining the individual route segments of the optimal route. Further, based at least on considering live and historic traffic data, the service computing device 108 may determine the time at which the vehicle is expected to reach each route segment. For example, in the case of intersection 115, the service computing device 108 may determine the time at which the vehicle 102 is expected to be approaching the intersection. The service computing device 108 sends the vehicle information for the vehicle 102 along with the expected intersection arrival time sends to one or more of the VECs 105 associated with the intersection 115. Based on this received information, the VEC 105 schedules the vehicle 102 to be served at the expected time.

In some examples herein, each VEC 105 (and its correspond RSU(s) 103) may have respective defined work zone (e.g., in a diameter thereabout, or the like) and which may range from meters to kilometers. The VEC 105 may support the vehicles within its work zone. Thus, when the vehicle 102 enters into the working zone of any VEC 105 and/or its corresponding RSU 103, the vehicle 102 may sends its location and other vehicle information to the VEC 105 through the RSU 103, such as using any suitable communication protocol, e.g., cellular-V2X, WiFi, or any other wireless communication technology, examples of which listed elsewhere herein. Thus, the vehicle 102 and the VEC 105 are able to establish communication through the RSU 103, and the VEC 105 is able to recognize the particular vehicle 102, such as through the vehicle information previously received from the service computing device 108. Based on recognizing the particular vehicle 102, the VEC 105 is able to provide the sensing and/or computational support that may have been specified by the service computing device 108 with the vehicle information provided to the VEC 105.

Furthermore, in some examples, the VEC 105 may utilize data from one or more of the vehicle computing devices 111 on one of the other vehicles 109 and/or sensors on the other vehicles 109 for performing the computational tasks, such as for providing additional sensor information to the vehicle 102. For instance, some of the vehicles 109 may have an overcapacity of computational processing resources. In this situation, the VEC 105 may itself offload one or more computational tasks to a vehicle 109 that has available computing capacity, receive the results back, and provide the results to the vehicle 102.

Additionally, in some examples, the service computing devices 108 may also provide computing resources to the vehicle 102, such as for computational tasks that are not time-critical. Since the VEC resources are located at substantially closer distance to the vehicles 102, 109 as compared to the service computing devices 108, execution of off-loaded time-critical safety and control applications may be performed typically in the VEC 105, rather than at the service computing devices 108, which may be physically located at a data center hundreds or thousands of miles away. Further, while RSUs 103 illustrated in the example of FIG. 1 are shown as being separate from the VECs 105, in other examples, the RSU 103 and VEC 105 may be combined into a single computing device able to send/receive data to/from the vehicles 102, 109, as well as to process the data. Further, as discussed below, the service computing devices 108 may provide numerous other functions for aiding the vehicles 102, 109 in autonomous navigation.

Figure 2:
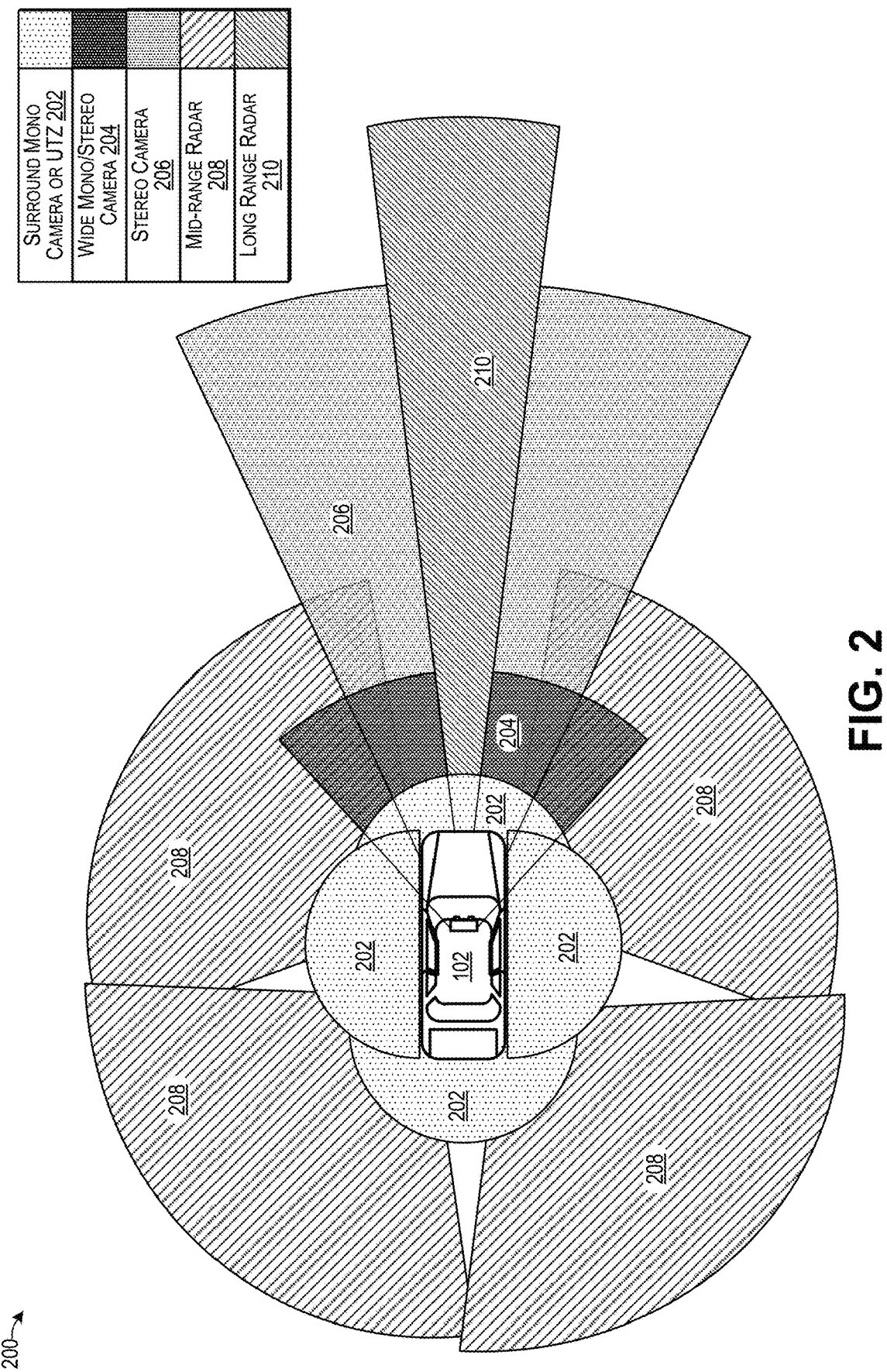
FIG. 2 illustrates an example vehicle sensor configuration according to some implementations.

FIG. 2 illustrates an example vehicle sensor configuration 200 according to some implementations. In this example, the vehicle 102 may be equipped with a wide range of sensors to detect and recognize roads, obstacles, signs, landmarks, and the like, along the travel path of the vehicle, as well as to navigate and avoid any collisions while partially or fully autonomous. For instance, as defined by the Society of Automotive Engineers (SAE), there are six levels of driving automation from Level 0 to Level 5. In particular, at "Level 0" (no driving automation) the driver performs all operating tasks like steering, braking, accelerating, and so forth. At "Level 1" (driver assistance), the vehicle can assist with some functions (e.g., cruise control), but the driver still handles all accelerating, braking, and monitoring of the surrounding environment. At "Level 2" (partial driving automation), the vehicle may assist with steering or acceleration functions and allow the driver to disengage from some of their tasks. Adaptive cruise control (ACC) is one example of Level 2 autonomy.

The concept of autonomous driving mainly starts from "Level 3" (conditional driving automation), in which the vehicle itself may monitor the surroundings and may exert some control over the vehicle (e.g., autonomous parking). At Level 3, a driver must be able to take over. At "Level 4" (high driving automation) a vehicle may be able to drive independently most of the time but will not operate unless all conditions are met. At "Level 5" (full driving automation) the vehicle is able to drive anywhere in all conditions. There is no need for pedals or a steering wheel, as the autonomous vehicle system controls all critical tasks, monitors the surroundings, and identifies unique driving conditions, such as traffic jams, obstacles, road closures, and so forth.

For the higher levels of automation (i.e., Level 3 to Level 5), the vehicle 102 may continuously monitor around the vehicle 102 to avoid any obstacles and navigate safely. There are various different kinds of sensors and sensing techniques that may be used for the vehicle 102 in such a situation. Commonly used sensors may include mono cameras, stereo cameras, infrared cameras, radar, lidar, lasers, ultrasonic sensors, GPS receivers, and so forth. For any specific driver assistance system application or any specific level of driving automation, the sensors may be selected based on the advantages and disadvantages of the sensor type, which may include detection range, type of detection ability, power requirements, cost, amount of data generated, and the like. Each sensor type may have advantages and disadvantages, and thus, different types of sensors may be combined in use on the vehicle 102 for improving accuracy in various weather or other types of conditions. For example, a single sensor type might not be able to meet recognition accuracy or range requirements in certain weather conditions.

As one example, a camera (mono/stereo) might not perform well in the dark or during inclement weather conditions, and the detection range may be comparatively low as compared to similarly priced radar sensors. However, a radar sensor might not be able to detect a human in the roadway and may have difficulty in detecting lane markers. On the other hand, a radar sensor may be a good candidate for long-range detection of other vehicles, as compared to other sensor types. As another example, an infrared camera may perform well under night conditions, but may also suffer from poor long-distance-detection capability. Additionally, a lidar sensor may perform well under night and day conditions, but may be costly and may generate huge amounts of data that may require a high capacity processor to process the data in real time. Further, while ultrasonic sensors are lower in cost than some other types of sensors, the detection range of ultrasonic sensors may be 10 meters or less, which may limit their usefulness.

In view of the foregoing, multiple different sensor types are typically employed for ADAS/AD vehicles to continuously monitor the vehicle surroundings. Commonly used sensors include mono camera, stereo camera, infrared camera, radar, lidar, laser, ultrasonic sensor, GPS, etc. For any specific driver assistance system application or any specific level of driving automation sensors are selected considering their advantages and disadvantages including range of motion, type of detection ability, power requirement, cost, amount of data generation, etc. Each sensor has its own advantages and disadvantages. It is often difficult to determine a single sensor that could meet the all-weather requirement considering recognition accuracy and range. Thus, automotive manufacturers use a single sensor or multiple sensor fusion system based on the level of autonomous driving systems as well as the cost. One of the examples of Level 2 ADAS application is Lane Keep Assist (LKA) system which is used for lane departure warning and lateral collision avoidance. An example of a sensor combination to realize 360 degrees monitoring around the vehicle for a Level 4 to 5 autonomous driving system is shown in FIG. 2. In addition, with the on-board sensors as shown in FIG. 2, vehicles may also be equipped with communication devices to share data with other vehicles, infrastructure, road edge computing modules, cloud data exchange and/or analytics platform, etc. Conventional cellular networks, DSRC, Wi-Fi, and the like, are communication protocols that may be used to communicate connected data between the vehicle 102 and other devices.

In FIG. 2, the example vehicle 102 is equipped with multiple different sensors for 360-degree monitoring of the vehicle surroundings. In this example, the vehicle 102 may be equipped with four surround mono cameras or ultrasound (UTZ) sensors, each having a respective approximate detection area 202 (front, back, left side, right side) as shown in FIG. 2. For example, mono cameras may have a sensing range of up to 10 m and may be useful for parking assistance, detecting close proximity obstacles and/or detecting pedestrians.

The vehicle 102 may also be equipped with a forward-facing wide-angle mono or stereo camera having an approximate detection area 204 in front of the vehicle 102. In addition, the vehicle 102 may be equipped with a forward-facing stereo camera having an approximate detection area 206 in front of the vehicle 102. Stereo camera-based vision sensing systems may be used for short/medium to long range recognition applications, such as for identifying and tracking different obstacles, landmarks, pedestrians, road signs, road features, traffic lights, etc., such as by using disparity maps or the like. Camera based sensing may be significantly affected by environmental conditions such as snow, rain, sunlight, darkness, etc.

Further, the vehicle 102 may be equipped with four mid-range radar sensors having respective approximate detection areas 208 surrounding the vehicle 102. Additionally, the vehicle 102 may be equipped with a long range radar sensor having an approximate detection area 210 in front of the vehicle 102. The radar sensors herein may employ milli-wave detection and ranging, and therefore may be robust to weather conditions, and may have a relatively long range of up to 250 m. However, radar-based measurements may lack detailed geometric information such as shape and size of an obstacle. In some examples, mid-range radar sensors may be useful for applications such as blind-spot assistance and emergency braking ADAS functions.

In some cases, a lidar sensor may be used in place of, or in addition to, one or more of the stereo camera, the long-range radar, or others of the above-discussed sensors. Further, while several example sensor configurations are discussed with respect to FIG. 2, numerous other sensor types, sensor locations, and sensor configurations will be apparent to those of skill in the art having the benefit of the disclosure herein. Accordingly, implementations herein are not limited to any particular sensor types, locations, or configurations.

In addition, with the onboard sensors herein, the vehicle 102 may be equipped with connected devices to share data with other vehicles, infrastructure, road edge computing modules, cloud data exchange, the data analytics platform, and so forth. Generally, fully and partially autonomous vehicles that share data with other vehicles and systems may be referred to as a "connected autonomous vehicle". Connected autonomous vehicles may receive data from the other sources as mentioned above and may process the received data to realize improved safety, comfort, efficiency, reduced travel times, and the like, during autonomous driving. Furthermore, in some cases, connected autonomous vehicles may share the data with other vehicles to realize traffic density, road usage, etc., as well as provide different values to other vehicles.

Figure 3:
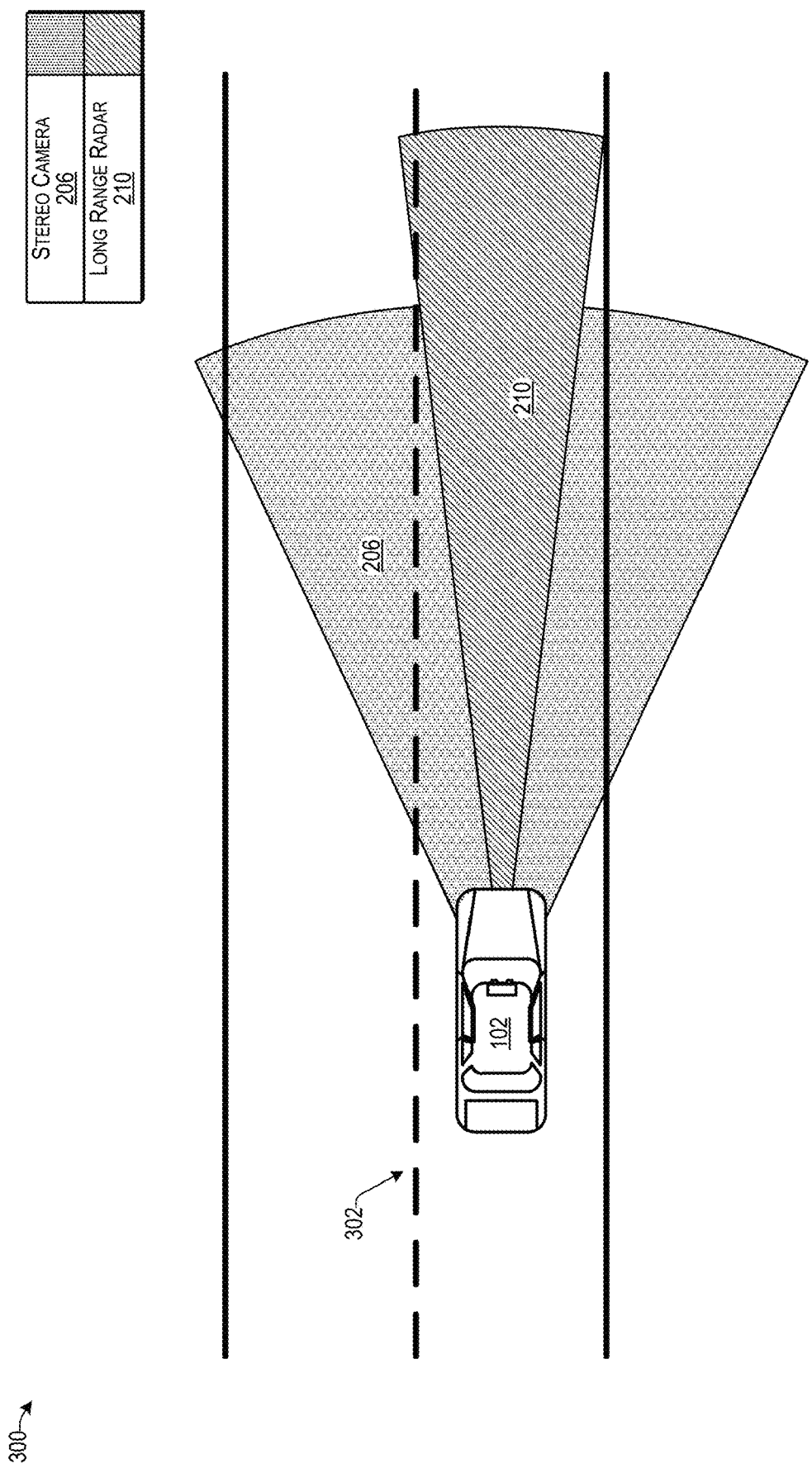
FIG. 3 illustrates an example vehicle sensor configuration according to some implementations.

FIG. 3 illustrates an example sensor configuration 300 according to some implementations. For instance, ADAS applications for lateral and longitudinal driver assist systems such as Lane Keep Assist (LKA) and adaptive cruise control (ACC) are relatively mature technologies that are available in production vehicles. These systems typically use single or multiple sensors to ensure safe and robust performance. The type and number of sensors employed on a vehicle may vary based on the type of the ADAS application.

In the example of FIG. 3, the LKA system may be employed for lane departure warning and lateral collision avoidance. For instance, the LKA system may assist the driver in safely maintaining the vehicle 102 in its own lane. Accordingly, in this example, the sensor usage configuration includes the stereo camera providing the detection area 206 and the long-range radar providing the detection area 210. For example, the long-range camera's detection area 210 provides a field of view that is able to measure road curvature and provide localization of the vehicle 102 within its lane 302. In some examples, the LKA system may include an actuator (not shown in FIG. 3) to provide haptic feedback to the driver by vibration to the driver seat, steering wheel, or the like. Thus, the LKA system may support the driver by providing alerts of lane departure, and the driver may then be responsible for taking control of the vehicle 102 and avoiding further lane departure.

Additionally, in some examples herein, rather than relying on driver response when lane departure occurs, the LKA system may employ sensor fusion from the long-range camera and the long-range radar to alert the driver and also activate the steering actuator. Accordingly, the steering actuator may be automatically engaged to return the vehicle to its proper lane. The sensor fusion algorithms may be required to meet strict performance and safety requirements.

Figure 4:
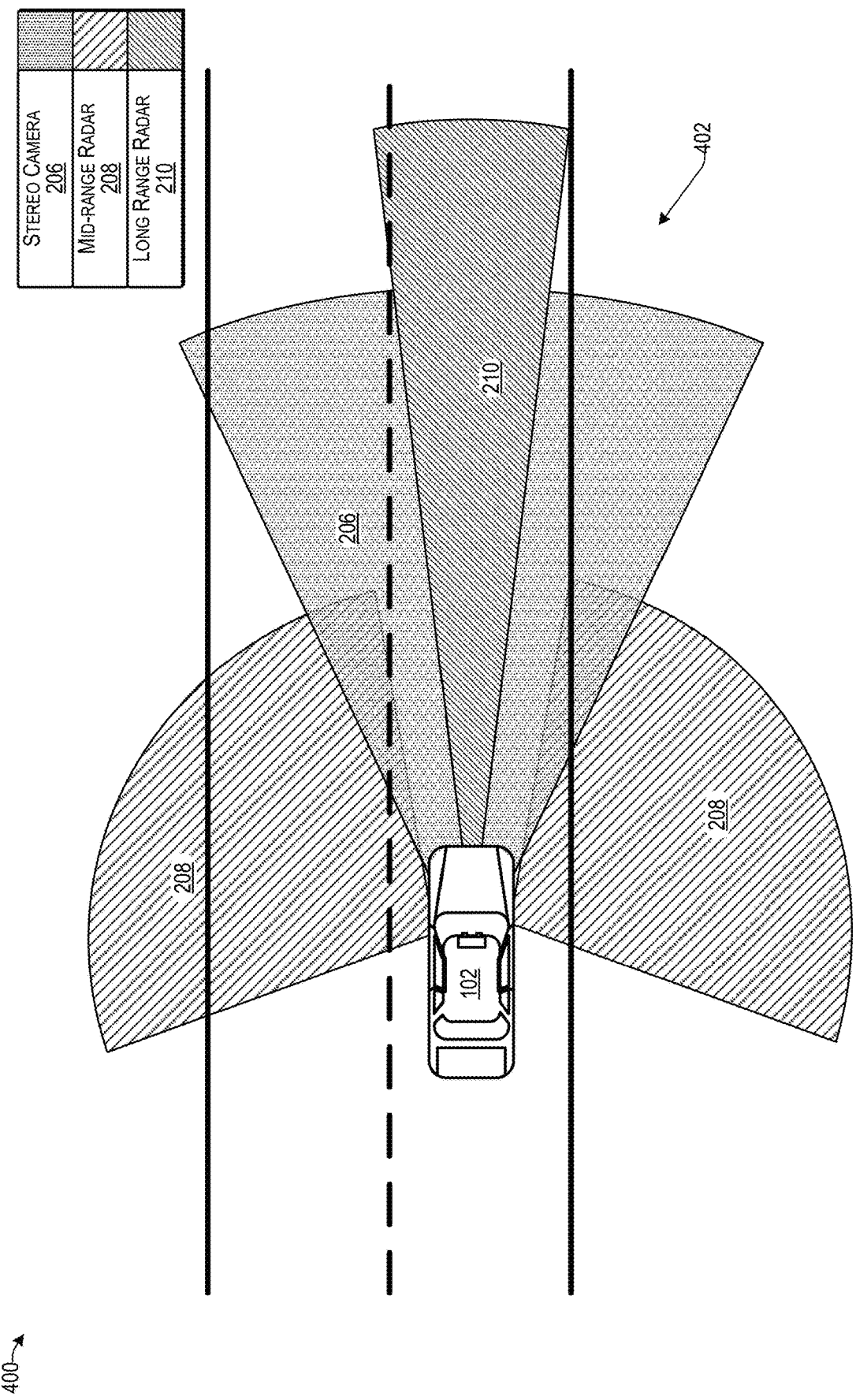
FIG. 4 illustrates an example vehicle sensor configuration according to some implementations.

FIG. 4 illustrates an example sensor configuration 400 according to some implementations. Adaptive cruise control (ACC) has a broader scope of longitudinal control functions than LKA systems and may be employed for front collision avoidance, traffic jam assistance in stop-and-go scenarios, as well as maintaining a proper following distance behind another vehicle during highway driving. The ACC system may automatically adjust the vehicle's speed and headway distance from the preceding vehicle. When the ACC system is engaged, the ACC system may ensure safe following distance and speed to aid the driver in avoiding accidents related to excessive speed or too short following distance. In the examples herein, the sensor configuration 400 for the ACC system may include a long-range radar with coverage area 210 having a long range FOV, two medium range radars with forward and side coverage areas 208 for obstacle detection with wide FOV, and the long range camera with the coverage area 206 having an FOV selected for lane detection and roadway detection. Accordingly, in this example, the coverage areas 206, 208 and 210 together may represent the vehicle sensor FOV 402 in the forward direction.

Although different sensors are widely used for different levels of automated driving systems, it remains challenging to design a sensor configuration that optimizes cost and efficiency. Single sensor systems or sensor fusion systems used for level 2 and level 2+ ADAS applications are comparatively cheaper than the sensor combinations used for fully automated driving systems (level 4 to 5). In addition, ECUs used to process multi-sensor data for Level 4 to 5 systems are also more expensive than those used for Level 2 and 2+ systems. Although Level 2 and 2+ automated driving systems provide a cost-effective solution, the systems cannot offer fully automated driving during an entire route compared to that offered by a Level 4 or 5 AD system. However, the target of the research community is to bring ultimate safety for realizing zero collisions. To achieve that, implementations herein may be configured to ensure that the fully and partially automated vehicles use a route that provides the maximum amount of autonomous driving by taking into consideration the sensor configuration of the particular vehicle. Thus, examples herein may select a safest route for an automated vehicle that enables the vehicle to maximize its time of fully automated driving.

To determine the ability of a vehicle to traverse a particular road segment based on the available sensors, examples herein may determine a Precautionary Observation Zone (POZ) for each road segment of a candidate route. The POZ herein may include an area of potential obstacles, street signs, traffic signals, etc., that a fully or partially automated vehicle (which may include a robot, drone vehicle, or the like) should monitor using its onboard sensors for avoiding collision, meeting regulations, and ensuring safety. The details of a technique for determining one or more POZs for any route, as well as using the determined POZs for selecting an optimal route are discussed additionally below.

In some examples, a semi-automated-driving or fully-automated-driving vehicle 102 is connected for communication with a data exchange and analytics platform executed on the service computing devices 108. The vehicle 102 may exchange information with the data analytics platform on the service computing devices 108 directly or through the RSUs 103 and VECs 105. The vehicle 102 may also be equipped with connected communication devices to share data with other vehicles 109 and/or infrastructure in addition to the VECs 105 and the service computing devices 108, such as to utilize additional sensor data and computing resources to maximize the amount of automated driving. For example, when the vehicle 102 is equipped with a limited number of sensors, the vehicle 102 might not be able to perform automated driving at a multi-leg intersection where the vehicle needs to monitor numerous different items, such as other vehicles from other lanes, pedestrians, traffic lights, walk signals, and so forth. In such cases, the vehicle 102 may utilize infrastructure sensors or other sensor data to understand the traffic and other information to use for automated driving. Moreover, to process this additional data, the vehicle could utilize computing resources of the VEC 105 and/or service computing devices 108. Examples herein are able to identify when and where the vehicle 102 may need to offload some processing tasks (e.g., to process additional data using VECs 105 and/or the service computing devices 108) to maximize the amount of automated driving performed by the vehicle 102. Thus, implementations herein may allocate and identify the available computing resources along a route at the beginning of a trip and may offload some of the computational tasks accordingly to maximize the amount of automated driving of the vehicle 102.

Figure 5:
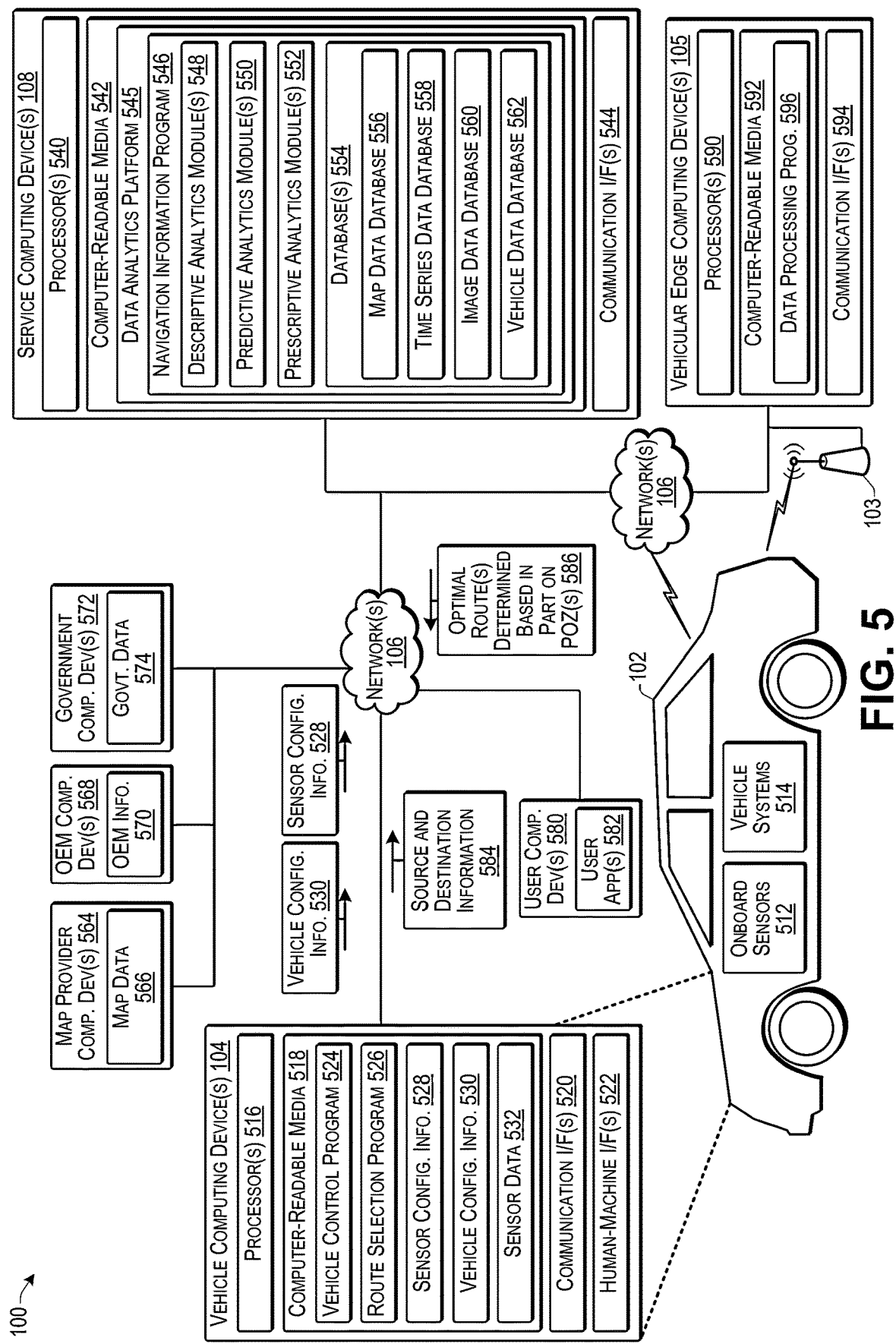
FIG. 5 illustrates an example hardware configuration of the system for allocating resources for a vehicle according to some implementations.

FIG. 5 illustrates an example hardware configuration of the system 100 for allocating resources for a vehicle according to some implementations. As discussed above with respect to FIG. 1, the system 100 includes the vehicle 102 having one or more vehicle computing devices 104 able to communicate wirelessly with the RSUs 103 and VECs 105, and also able to communicate directly over the one or more networks 106. For example, the vehicle computing devices 104 may communicate over the one or more networks 106 with one or more of the service computing devices 108.

The vehicle 102 may further include one or more onboard sensors 512 and one or more vehicle systems 514 that are in communication with the vehicle computing device(s) 104, such as via a CAN bus (controller area network bus) (not shown in FIG. 5) or any other suitable communication link. In some examples, the service computing device(s) 108 may calculate precautionary observation zones (POZs) for candidate routes and may select the optimal route for the vehicle 102. In other examples, the vehicle 102 or the VEC 105 may perform some of the calculation of the POZs such as by using data received from the service computing devices 108. In some cases, selection of the optimal route may include consideration of the computational resources available for the vehicle in association with each respective POZ on each candidate route.

Each vehicle computing device 104 may include one or more processors 516, one or more computer-readable media 518, one or more communication interfaces (I/Fs) 520, and one or more vehicle human-machine interfaces (I/Fs) 522. In some examples, the vehicle computing device(s) 104 may include one or more ECUs (electronic control units) or any of various other types of computing devices. For instance, the computing device(s) 104 may include one or more ADAS/AD ECUs for controlling at least some of the vehicle systems 514, such as to perform ADAS and/or AD tasks, such as navigation, braking, steering, acceleration, deceleration, and so forth. The computing device(s) 104 may also include one or more other ECUs, such as for controlling other systems of the vehicle systems 514, sensors 512, and so forth.

"ECU" is a generic term for any embedded processing system that controls one or more of the systems, subsystems, or components in a vehicle. Software, such as a vehicle control program 524 and a route selection program 526 may be executed by one or more ECUs and may be stored in a portion of the computer-readable media 518 (e.g., program ROM, solid state storage, etc., as discussed below) associated with the respective ECU to enable the ECU to operate as an embedded system. ECUs on a vehicle may typically communicate with each other over a vehicle bus, such as the CAN bus mentioned above, according to a vehicle bus protocol. As an example, the CAN bus protocol is a vehicle bus protocol that allows ECUs and the vehicle systems 514 to communicate with each other without a host computer. CAN bus may include at least two different types. For example, high-speed CAN may be used in applications where the bus runs from one end of the environment to the other, while fault-tolerant CAN is often used where groups of nodes are connected together.

Each ECU or other vehicle computing device 104 may include one or more processors 516, which may include one or more of central processing units (CPUs), graphics processing units (GPUs), microprocessors, microcomputers, microcontrollers, system-on-chip processors, digital signal processors, state machines, logic circuits, and/or any devices that manipulate signals based on operational instructions. As one example, the processor(s) 516 may include one or more hardware processors and/or logic circuits of any suitable type specifically programmed or configured to execute the algorithms and other processes described herein. The processor(s) 516 may be configured to fetch and execute computer-readable instructions stored in the computer-readable media 518, which may program the processor(s) 516 to perform the functions described herein.

The computer-readable media 518 may include volatile and nonvolatile memory and/or removable and non-removable media implemented in any type of technology for storage of information, such as computer-readable instructions, data structures, programs, program modules, and other code or data. For example, the computer-readable media 518 may include, but is not limited to, RAM, ROM, EEPROM, flash memory or other memory technology, optical storage, solid state storage, magnetic disk, network-attached storage, cloud storage, or any other medium that can be used to store the desired information and that can be accessed by a computing device. Depending on the configuration of the vehicle computing device(s) 104, the computer-readable media 518 may be a tangible non-transitory medium to the extent that, when mentioned, non-transitory computer-readable media exclude media such as energy, carrier signals, electromagnetic waves, and/or signals per se. In some cases, the computer-readable media 518 may be at the same location as the vehicle computing device 104, while in other examples, a portion of the computer-readable media 518 may be remote from the vehicle computing device 104.

The computer-readable media 518 may be used to store any number of functional components that are executable by the processor(s) 516. In many implementations, these functional components comprise instructions or programs that are executable by the processor(s) 516 and that, when executed, specifically program the processor(s) 516 to perform the actions attributed herein to the vehicle computing device 104. Functional components stored in the computer-readable media 518 may include the vehicle control program 524 and the route selection program 526, each of which may include one or more computer programs, applications, executable code, or portions thereof. Further, while these programs are illustrated together in this example, during use, some or all of these programs may be executed on separate vehicle computing device(s) 104. Alternatively, in some examples, each of these programs 524 and 526 may be part of a single program.

In addition, the computer-readable media 518 may store data, data structures, machine-learning models, and other information used for performing the functions and services described herein. For example, the computer-readable media 518 may store sensor configuration information 528 that includes information about the sensor type, field of view, detection resolution, detection range and other capabilities, current status and operability, and so forth, of the sensors 512 on board the vehicle 102. Further, the computer-readable media 518 may store vehicle configuration information 530 that includes information about the vehicle, such as powertrain configuration information, suspension information, tire information, as well as vehicle brand, model, year, trim level, and the like. Additionally, the computer-readable media 518 may store, at least temporarily, sensor data 532 received from the onboard sensors 512, and which may include information about obstacles and landmarks detected during a trip, vehicle location information, and so forth.

Further, while the functional components, data and data structures are illustrated together in this example, during use, some or all of these elements may be stored on or by separate ones of the computing device(s) 104. The computing device(s) 104 may also include or maintain other functional components and data, which may include programs, drivers, etc., and the data used or generated by the other functional components. Further, the computing device(s) 104 may include many other logical, programmatic, and physical components, of which those described above are merely examples that are related to the discussion herein.

The one or more communication interfaces 520 may include one or more software and hardware components for enabling communication with various other devices, such as over the CAN bus, over the one or more network(s) 106, over the air with the RSUs 103, and, in some cases, with other vehicles. For example, the communication interface(s) 520 may enable communication through one or more of a LAN, the Internet, cable networks, cellular networks, wireless networks (e.g., Wi-Fi) and wired networks (e.g., CAN, Fibre Channel, fiber optic, Ethernet), direct connections, as well as close-range communications such as BLUETOOTH®, vehicle-to-vehicle, and the like, as additionally enumerated elsewhere herein.

The sensor data 532 may include sensor data received from the onboard sensors 512. For example, the onboard sensors 512 may include any of a plurality of different types of sensors such as a camera system, radar, LIDAR, ultrasound, a global navigation satellite system (GNSS) receiver (referred to hereinafter by the common usage name "GPS", which is also intended to be inclusive of any other satellite navigation system), accelerometers, a compass, and the like. In addition, the sensor data 532 used by the vehicle control program 524 may include information received from or associated with various vehicle systems 514, such as (not shown in FIG. 5) from a suspension controller associated with the suspension system, a steering controller associated with the steering system, a vehicle speed controller associated with a braking and acceleration system, and so forth.

For example, the vehicle control program 524 may use rule-based and/or artificial-intelligence-based control algorithms, or any combination thereof, to determine parameters for vehicle control. For instance, the vehicle control program 524 may determine an appropriate action, such as braking, steering, accelerating, or the like, and may send one or more control signals to one or more vehicle systems 514 based on the determined action. For example, the vehicle control program 524 may send control signals to the suspension controller, the steering controller, and/or the vehicle speed controller for controlling or partially controlling the vehicle in some applications.

The human-machine interface(s) 522 may include any suitable type of input/output devices, such as buttons, knobs, joysticks, touchscreens, speakers, microphones, voice recognition and artificial speech technology, in-cabin sensors, such as eye monitoring cameras, vital sign monitors, and so forth. As one example, a vehicle occupant may use a human-machine interface 522 to indicate a destination location, such as via voice command or touchscreen inputs. Implementations herein are not limited to any particular type of human-machine interfaces 522.

The service computing device(s) 108 may include one or more servers or other types of computing devices that may be embodied in any number of ways. For instance, in the case of a server, the programs, other functional components, and data may be implemented on a single server, a cluster of servers, a server farm or data center, a cloud-hosted computing service, and so forth, although other computer architectures may additionally or alternatively be used.

Further, while the figures illustrate the functional components and data of the service computing device 108 as being present in a single location, these components and data may alternatively be distributed across different computing devices and different locations in any manner. Consequently, the functions may be implemented by one or more service computing devices, with the various functionality described herein distributed in various ways across the different computing devices. Multiple service computing devices 108 may be located together or separately, and organized, for example, as virtual servers, server banks, and/or server farms. The described functionality may be provided by the servers of a single entity or enterprise, or may be provided by the servers and/or services of multiple different entities or enterprises.

In the illustrated example, each service computing device 108 may include one or more processors 540, one or more computer-readable media 542, and one or more communication interfaces 544. Each processor 540 may be a single processing unit or a number of processing units, and may include single or multiple computing units or multiple processing cores. The processor(s) 540 can be implemented as one or more microprocessors, microcomputers, microcontrollers, digital signal processors, central processing units, state machines, logic circuitries, and/or any devices that manipulate signals based on operational instructions. For instance, the processor(s) 540 may be one or more hardware processors and/or logic circuits of any suitable type specifically programmed or configured to execute the algorithms and processes described herein. The processor(s) 540 can be configured to fetch and execute computer-readable instructions stored in the computer-readable media 542, which can program the processor(s) 540 to perform the functions described herein.

The computer-readable media 542 may include volatile and nonvolatile memory and/or removable and non-removable media implemented in any type of technology for storage of information, such as computer-readable instructions, data structures, program modules, or other data. Such computer-readable media 542 may include, but is not limited to, RAM, ROM, EEPROM, flash memory or other memory technology, optical storage, solid state storage, magnetic tape, magnetic disk storage, storage arrays, network-attached storage, storage area networks, cloud storage, or any other medium that can be used to store the desired information and that can be accessed by a computing device. Depending on the configuration of the service computing device 108, the computer-readable media 542 may be a type of computer-readable storage media and/or may be a tangible non-transitory media to the extent that when mentioned herein, non-transitory computer-readable media exclude media such as energy, carrier signals, electromagnetic waves, and signals per se.

The computer-readable media 542 may be used to store any number of functional components that are executable by the processors 540. In many implementations, these functional components comprise instructions or programs that are executable by the processors 540 and that, when executed, specifically configure the one or more processors 540 to perform the actions attributed above to the service computing device 108. For example, the functional components may together provide a data analytics platform 545 that provides the functions attributed to the service computing devices 108. Functional components stored in the computer-readable media 542 may include a navigation information program 546 that may be executed to configure the service computing device 108 to determine and send navigation information, such as routing information, to the vehicle computing device 104. For example, the navigation information program 546 may include one or more descriptive analytics modules 548, one or more predictive analytics modules 550, and one or more prescriptive analytics modules 552, which may be executed for determining an optimal route for the vehicle 102, such as based on determining one or more POZs and allocation of computing resources for the vehicle 102, as well as for performing other functions.

Examples of descriptive analytics modules 548 may include modules that perform communications, determining vehicle FOV, authentication, data filtering, data fusion, and candidate route prediction and monitoring. Examples of predictive analytics modules 550 may include destination prediction, candidate route prediction and monitoring, determining a precautionary observation zone, speed profile determination, determining VEC locations, and determining computational requirements for vehicles for candidate routes. Examples of prescriptive analytics modules 552 may include modules for routing recommendations and scheduling VEC resources for a vehicle 102.

In addition, the computer-readable media 542 may store or access data used for performing the operations described herein. Further, in some examples, the data may be stored in any suitable type of data structures, such as in one or more databases 554. Examples of databases 554 may include a map data database 556, a time series data database 558, an image data database 560, and a vehicle data database 562. For example, the map data database 556 may include information related to a required FOV for selected road segments, road profiles, high definition maps, and standard maps for various geographic regions. Furthermore, the time series data database 558 may include information such as traffic data, weather data, vehicular communication data, vehicle CAN data, sensor data, and so forth. Additionally, the image data database 560 may maintain images of roads, landmarks, intersections, and the like, such as may be received from infrastructure cameras, cell phone cameras, vehicle-mounted cameras, and so forth. In addition, the vehicle data database 562 may include information about each vehicle that uses the system 100, which may include vehicle identification information to use for communicating with the vehicle, sensor configuration information 528, vehicle configuration information 530, past destinations of the vehicle or vehicle occupants, information about an owner or other occupant associated with the vehicle, such as an occupant profile including occupant information and preferences, and so forth.

Further, the service computing device 108 may also include or maintain other functional components and data not specifically shown in FIG. 5, which may include programs, drivers, etc., and the data used or generated by the functional components. Additionally, the service computing device 108 may include many other logical, programmatic, and physical components, of which those described above are merely examples that are related to the discussion herein. Examples of machine-learning models (MLMs) that may be used in some examples of the modules 548, 550 and/or 552 herein, such as for the AI-based algorithms and models, may include predictive models, decision trees, classifiers, regression models, such as linear regression models, support vector machines, stochastic models, such as Markov models and hidden Markov models, and artificial neural networks, such as self-organizing neural networks, recurrent neural networks, convolutional neural networks, modular neural networks, deep-learning neural networks, and so forth.

The communication interface(s) 544 may include one or more interfaces and hardware components for enabling communication with various other devices, such as over the network(s) 106. For example, communication interface(s) 544 may enable communication through one or more of the Internet, cable networks, cellular networks, wireless networks (e.g., Wi-Fi) and wired networks (e.g., fiber optic and Ethernet), as well as close-range communications, such as BLUETOOTH®, BLUETOOTH® low energy, DSRC, and the like, as additionally enumerated elsewhere herein.

In addition, the service computing device(s) 108, and in some cases, the vehicle computing device(s) 104 may be able to communicate over the one or more networks 106 with one or more information source computing devices, such as web servers, service provider computing devices, public databases, private databases, or the like. Information source computing devices illustrated in this example include one or more map provider computing device(s) 564 that may provide map data 566 to the service computing devices 108 and/or to the vehicle computing devices 104. Additionally, one or more OEM (original equipment manufacturer) computing devices may provide OEM information 570 about vehicles that they manufacture and/or may receive information about their vehicles from the service computing devices 108. Further, one or more government computing devices 572 may provide government data 574, such as road information, department of motor vehicle information, construction information, and so forth.

The information source computing device(s) 564, 568 and 572 may include hardware and software configurations similar to the service computing devices 108 described above, but with different functional components and data stored thereon or associated therewith. Further, while several types of information source computing devices are described herein, numerous other types of information source computing devices may provide information to the service computing devices 108 and/or the vehicle computing devices 104. For example, the information source computing devices may provide local condition data to the service computing device(s) 108 for indicating the current conditions of specified road segments, such as with respect to weather conditions, traffic, road closures, special events, and so forth.

In addition, a user computing device 580 may execute one or more user applications 582 for providing information and/or instructions to the service computing device 108. For instance, the user computing device may be a mobile device such as a cell phone, smart phone, tablet, wearable device, laptop, or the like that may be used to communicate directly with the service computing device 108 over the one or more networks 106. As one example, the user application 582 may include a browser and the user may use the browser to interact with the service computing device 108 such as for setting preferences, providing information about the vehicle 102, providing information about the user, or the like, via a web application, website, or other suitable user interface.

The VEC(s) 105 may include one or more processors 590, one or more computer readable media 592, and or more communication interfaces 594. The one or more processors 590 may correspond to any of the processors 540 discussed above with respect to the service computing devices 108. The computer readable media 592 may correspond to any of the computer readable media 542 discussed above with respect to the service computing devices 108. The communication interfaces 594 may correspond to any of the communication interfaces 544 discussed above with respect to the service computing devices 108.

The computer readable media 592 of the VEC 105 may include different functional components and data from that included in the service computing devices 108. For instance, in this example, the VEC 105 includes a data processing program 596 that may perform data processing on behalf of vehicle computing devices 104. The data processing program 596 may further manage scheduling of a plurality of vehicles 102 received from the service computing devices 108 for communicating with the respective vehicles 102 when within a threshold radio communication range of the respective VEC 105.

In some examples herein, the vehicle computing device 104 may provide, to the service computing device 108, source and destination information 584 for a trip. For example, the route selection program 526 may be executed by the vehicle computing device 104 to send to the service computing device 108 the source location and destination location for desired travel. In addition, the vehicle computing device 104 may provide the sensor configuration information 528 and/or vehicle configuration information 530 to the service computing device 108 if the service computing device 108 does not already possess this information in the vehicle data database 562. Alternatively, in other examples, the vehicle computing device 104 may merely provide source location information to the service computing device 108 and may request a route from the service computing device 108. In response, the service computing device may predict a destination location, such as based on a current time, current location, and an analysis of past trips made by the vehicle 102. As still another example, the service computing device 108 may send a communication to cause the human machine interface 522 to query the vehicle occupant as to a destination location.

As discussed in additional detail below, the service computing device 108 may execute the navigation information program 546 to determine an optimal route for the vehicle 102 from the source location to the destination location. For example, the service computing device may execute the descriptive analytics module(s) 548, the predictive analytics module(s) 550, and the prescriptive analytics module(s) 552 to determine the optimal route based at least in part on determination of one or more POZs for one or more candidate routes and the computational requirements and computational resource availability associated with each of the determined POZs. The service computing device 108 may further send scheduling requests to the VEC 105 to determine the availability of the computational resources of the respective VEC's 105 along the candidate routes. Upon determining the optimal route(s), the service computing device 108 may send the selected optimal route(s) 586 determined based in part on POZ(s) and computational resource availability to the vehicle computing device 104. The vehicle control program 524 may be executed by the vehicle computing device 104 to navigate the vehicle 102 according to the optimal route(s) 586. Details of determining and selecting the optimal route(s) 586 based in part on POZs and available computational resources are discussed additionally below.

To realize the benefits of connected vehicle technologies for partially/fully autonomous vehicles, the connected data analytics platform 545 may receive various different types of the data from different sources such as vehicles 102, infrastructure cameras and other sensors, cellphones, other transportation data services, and so forth, as discussed above. The data analytics platform 545 may process the received data to derive value for end users by using various different modules categorized in analytics layers, such as the descriptive analytics module(s) 548, predictive analytics module(s) 550, and prescriptive analytics module(s) 552. The descriptive analytics modules 548 may include multiple modules used for data processing, authentication, data filtering, data fusing, and so forth. The predictive analytics module(s) 550 may be used to predict different features expected for vehicle control, such as vehicle speed, route, anomaly prediction, and the like, such as by employing AI algorithms, simulation programs, and so forth. The prescriptive analytics modules 552 may include AI modules that provide values to various end users based on their respective requirements for safety, efficiency, comfort, and the like. Accordingly, the data analytics platform 545 may provide values based on user inputs and/or prediction. Furthermore, while three different types of modules are described in the example of FIG. 5, fewer or more types of modules may be employed in other examples of the system herein.

FIGS. 6-10, 13, and 16 include flow diagrams illustrating example processes according to some implementations. The processes are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures, and the like, that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, systems, and devices described in the examples herein, although the processes may be implemented in a wide variety of other environments, systems, and devices.

Figure 6:
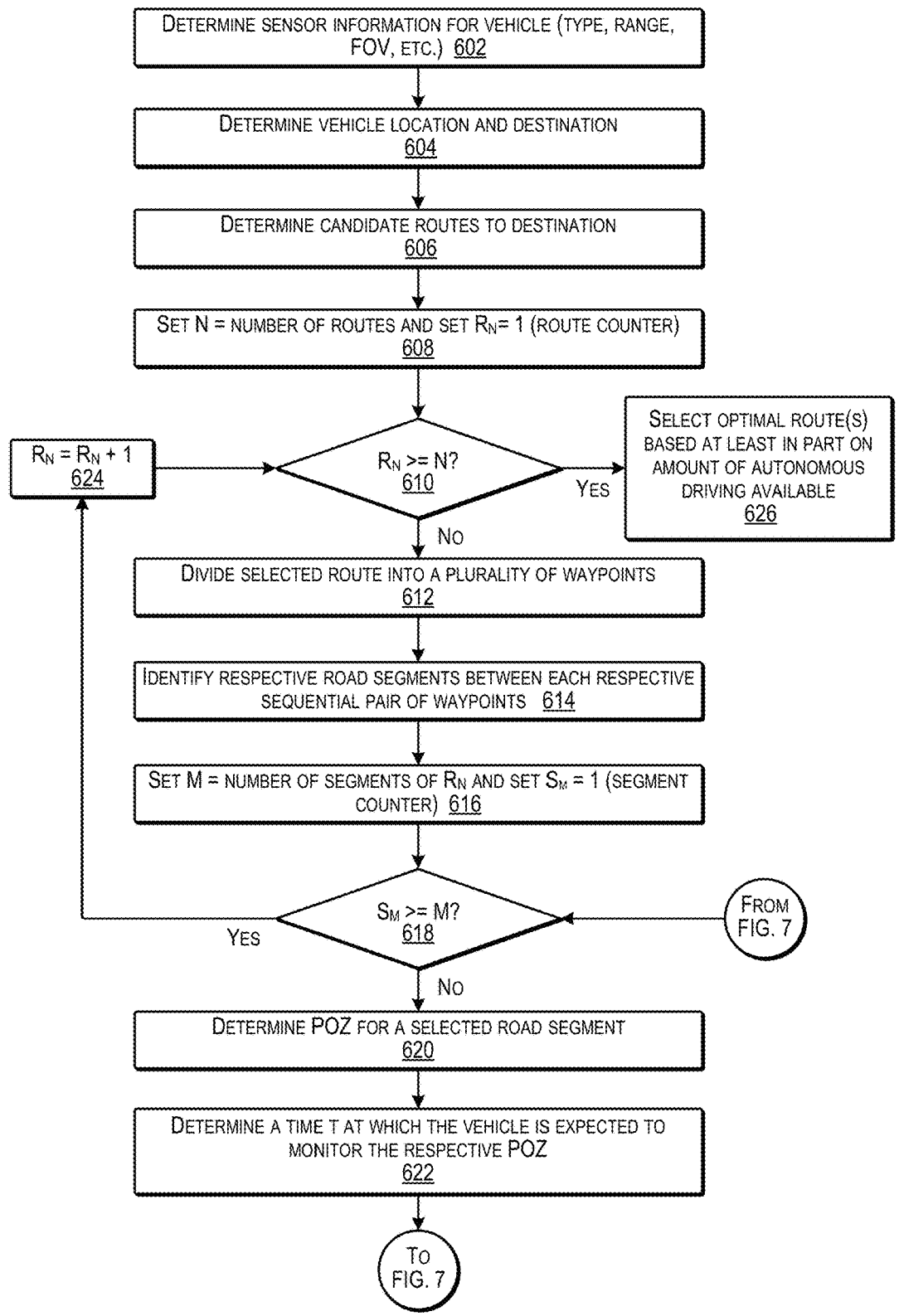
FIG. 6 is a flow diagram illustrating an example process for determining an optimal route from candidate routes according to some implementations.

FIG. 6 is a flow diagram illustrating an example process 600 for determining an optimal route from candidate routes according to some implementations. In some examples, the process 600 may be executed by the system 100 discussed above. For example, the process 600 may be executed by the service computing device 108 executing the navigation information program 546. Alternatively, as mentioned above, in other examples, the process 600 may be executed by at least one of the VEC 105 or the vehicle computing device 104.

At 602, the service computing device may determine sensor information for the vehicle. For example, the service computing device may receive sensor information from the vehicle for determining the types of sensors, number of sensors, ranges, FOVs, resolutions, and so forth.

At 604, the service computing device may determine the vehicle location and destination, such as by receiving one or more communications from the vehicle. For instance, at the beginning of a trip, the vehicle 102 may share its location, destination, sensor information, ECU specifications, etc. with the service computing devices 108.

At 606, the service computing device may determine candidate routes to the destination. For example, a routing and monitoring algorithm may be executed in either the descriptive analytics layer or the predictive analytics layer, as discussed additionally below.

At 608, the service computing device may initialize a first loop by setting a first variable N=number of routes, e.g., representative of the total number candidate routes, and setting a second variable $R_N$=1, e.g., as a counter representative of the candidate route currently selected for processing.

At 610, the service computing device may determine whether the value of $R_N$ is greater than or equal to the value of N. If not, the process goes to block 612 to evaluate a candidate route. If so, all of the candidate routes have been evaluated and the process goes to block 626.

At 612, the service computing device may divide the selected route into a plurality of waypoints. As one example, the waypoints may be defined in advance on a high definition map or a standard map that may be stored in the map data database 556.

At 614, the service computing device may identify respective road segments between each respective sequential pair of waypoints. The length of each road segment between each pair of waypoints may vary from a few centimeters to several hundred meters.

At 616, the service computing device may initialize a nested second loop by setting a third variable M=number of segments of $R_N$, and setting a fourth variable $S_M$=1, e.g., as a counter representative of the segment currently selected for processing.

At 618, the service computing device may determine whether $S_M$ is greater than or equal to M. If not, the process goes to block 620 to evaluate a road segment of the candidate route. If so, all the road segments for the route have been evaluated, and the process goes to block 624 to increment $R_N$ and begin processing the next candidate route, if any.

At 620, the service computing device may determine a POZ for the selected road segment. Examples of how to determine a POZ are discussed below, e.g., with respect to FIGS. 13-15. In some examples, a POZ may include an area of potential obstacle, a sign, or the like, that an automated vehicle or robot needs to monitor using its onboard sensors for avoiding collision, meeting regulations, and/or ensuring safety.

At 622, the service computing device may determine a time t at which the vehicle is expected to monitor the respective POZ determined at 620. The process then continues at FIG. 7.

At 624, when $S_M$=M, all of the segments in the candidate route have been processed, and the service computing device may increment the variable $R_N$ by a value of one. The process may then return to block 606 to determine whether all candidate routes have been processed, i.e., $R_N$=N.

At 626, when all candidate routes have been processed, the service computing device may select one or more optimal routes based at least in part on the amount of autonomous driving available for each respective candidate route. For instance, the optimal route selected may be the route with the highest percentage of autonomous driving time compared with the total driving time of the route, may be the route with the highest percentage of road segments marked as autonomous driving available, or the like. Further, in some cases, the amount of autonomous driving available may be only one factor of several considered when selecting a route as the optimal route. Examples of other factors considered may include total driving time to the destination, vehicle occupant comfort, amount of fuel/energy predicted to be consumed by the vehicle when traversing the respective route, or the like.

Figure 7:
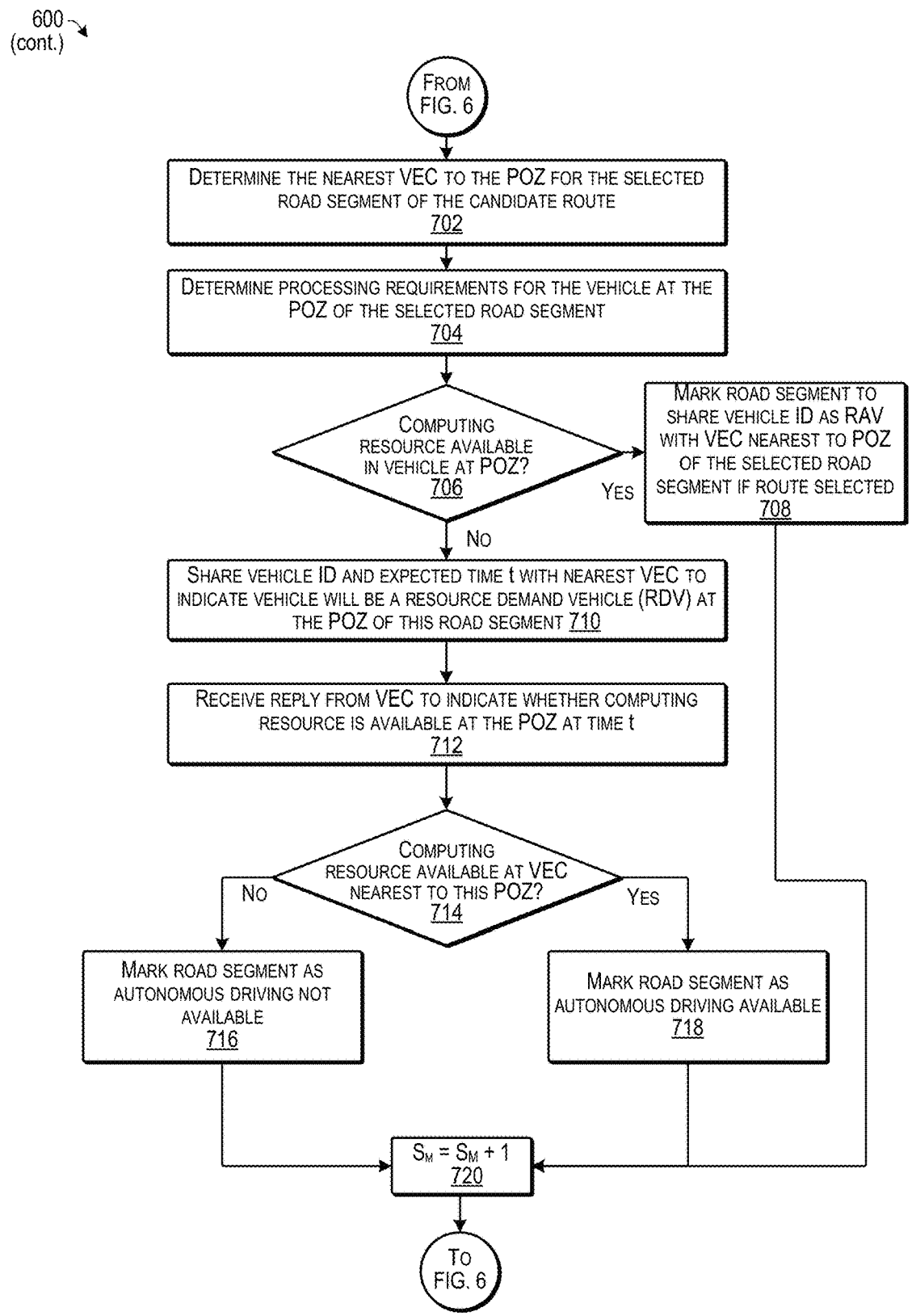
FIG. 7 is a flow diagram that illustrates a continuation of the process of FIG. 6 according to some implementations.

FIG. 7 is a flow diagram that illustrates a continuation of the process 600 of FIG. 6 according to some implementations.

At 702, following block 622, the service computing device may determine the VEC nearest to the POZ for the selected road segment of the candidate route.

At 704, the service computing device may determine processing requirements for the vehicle at the POZ of the selected road segment. For instance, to operate the vehicle as a fully automated vehicle, the vehicle's sensors must have the field of view (FOV) to capture the POZ of the corresponding road segment. In the case that the vehicle sensors cannot cover the POZ for a selected road segment, the service computing device may check for additional data (e.g., data from infrastructure sensors, sensors on other vehicles, or other sensors) that may be obtained and processed by a VEC to provide navigational information (e.g., objects, traffic, signs, signals, road anomalies, or the like) to the vehicle 102.

At 706, the service computing device may determine whether computing resources in the vehicle will be available for use by the VEC at the POZ of the road segment being processed. If so, the process goes to 708. If not, the process goes to 710.

At 708, the service computing device may mark or otherwise designate the road segment to share the vehicle ID as a resource available vehicle (RAV) with the VEC nearest to the POZ of the selected road segment if the candidate route being evaluated is selected. Thus, at the time t, the vehicle may be one that the VEC may access for performing some computational processing for another vehicle in the vicinity of the POZ.

At 710, the service computing device may share the vehicle ID and expected time t with nearest VEC determined at 702 to indicate that the vehicle will be a resource demand vehicle (RDV) at the POZ of this road segment at the time t, to determine whether the VEC will have computational capacity to provide resources to the vehicle 102.

At 712, the service computing device may receive a reply from the VEC to indicate whether a sufficient computing resource is available at the POZ at time t.

At 714, the service computing device may determine whether the VEC indicated that a computing resource is available at the VEC nearest to the POZ of the road segment currently being evaluated. If so, the process goes to 718. If not, the process goes to 718.

At 716, the service computing device may mark or otherwise indicate the road segment as having autonomous driving not available. For example, if a sufficient amount of computing resources are not available at the VEC nearest to the POZ of the road segment at the indicated time t, then autonomous operation of the vehicle through the POZ may not be possible and the road segment being analyzed may be indicated as such.

At 718, the service computing device may mark or otherwise indicate the road segment to have autonomous driving available. For example, if the VEC nearest to the POZ indicates that sufficient computing resources are available at the indicated time t, then the road segment is indicated to be an automated driving road segment.

At 720, the service computing device may increment the variable SM by a value of one, and may return to block 618 of FIG. 6. For example, the process of blocks 612, 614, and 702-720 may be repeated until all road segments in a selected candidate route have been analyzed. When this process is complete, block 618 redirects the process to block 624 to increment the route counter for selecting a next candidate route, if any, for processing. As discussed above with respect to block 626, when all candidate routes have been processed, the service computing device may select one or more optimal routes to send to the vehicle 102.

Figure 8:
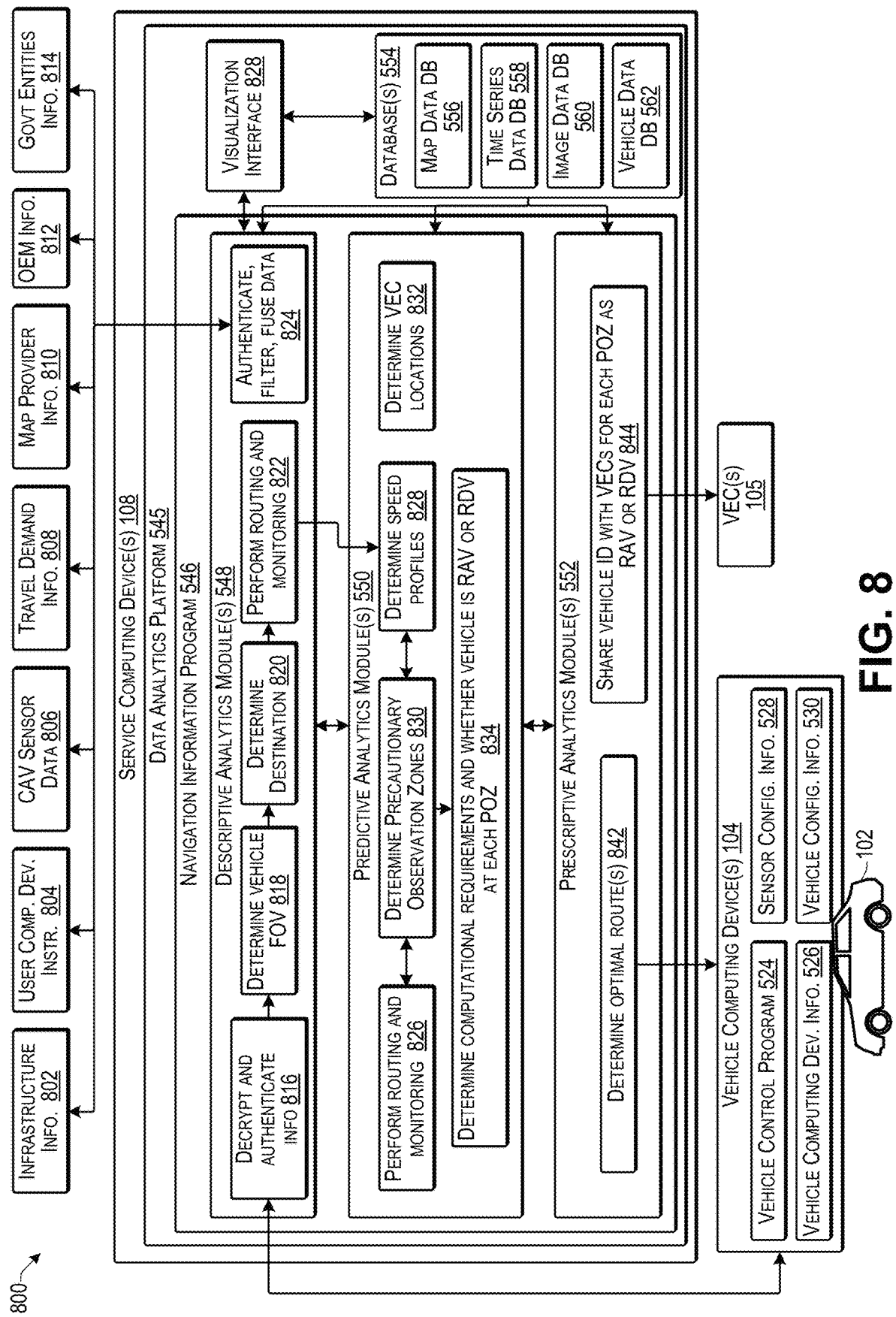
FIG. 8 is a combined flow diagram and block diagram illustrating an example architecture and process for selecting an optimal route for a vehicle according to some implementations.

FIG. 8 is a combined flow diagram and block diagram illustrating an example architecture and process 800 for selecting an optimal route for a vehicle according to some implementations. For instance, the example of FIG. 8 includes a detailed system architecture and data flow that may be used to identify a safe route that maximized automated driving for a connected vehicle by determining POZs along candidate routes and taking into consideration a vehicle's onboard sensor configuration, vehicle powertrain configuration, and other vehicle configuration information. In some cases, the architecture of FIG. 8 may correspond to the system 100 discussed above with respect to FIGS. 1 and 5. The data analytics platform 545 receives the data from different sources such as vehicles, infrastructure sensors, cellphones, web servers of fleet companies, insurance providers, government entities, other transportation data services, and so forth. The data analytics platform 545 may process the received data to derive values for end users by using different artificial intelligence (AI) modules categorized in different analytics layers, including the descriptive analytics modules 548, the predictive analytics modules 550, and prescriptive analytics modules 552, as well as databases 554 and a visualization interface. Further, the data analytics platform 545 is able to share vehicle data with other third parties such as OEMs and may ingest data from third parties, such as map providers, into the data analytics platform 545.

In some examples, a portion of the process described may be executed by the vehicle computing device(s) 104, and another portion of the process may be executed by the service computing device(s) 108 or the VECs 105. Furthermore, while in this example, certain functions are being illustrated as being performed by one or the other of the computing devices 104, 105, or 108, respectively, it will be readily apparent to those of skill in the art having the benefit of the disclosure herein that some of the functions may be performed by other ones of the computing devices 104, 105, or 108.

The service computing device(s) 108 hosting the data analytics platform 545 may receive various types of information from various different sources and also may provide data to one or more of the sources. Examples include infrastructure information 802, user computing device instructions 804, CAV sensor data 806, travel demand information 808, map provider information 810, OEM information 812, and government entity information 814. As mentioned above, the infrastructure information 802 may include infrastructure camera images, and other information about infrastructure, road conditions, construction projects, and the like. Furthermore, the user computing device instructions 804 may include user preferences, user information, vehicle information, and the like, received through a user computing device such as through a website or web app interface. Furthermore, the CAV sensor data 806 may include data received directly from vehicle sensors of connected autonomous vehicles, such as connected sensors that automatically transmit data from the vehicle 102 or other vehicles 109 (not shown in FIG. 8) to the service computing device 108.

The travel demand information 808 may provide an indication of possible road crowding based on current and expected demand, which may be based in part on scheduled holidays, air travel and rail travel ticket sales, sporting events and other types of event sales, and so forth. The map provider information 810 may include high definition and low definition maps as well as other information such as traffic data and the like. The OEM information 812 may provide various information about vehicles produced by particular OEMs such as powertrain information, fuel efficiency, and so forth. The government entity information 814 may indicate government provided safety information, traffic sign information, road construction information, road closure information, and so forth. In some examples, one or more data exchange application programing interfaces (APIs) may be employed for exchanging data with the above-discussed entities, such as for receiving data from the above-discussed entities or sending data to the above-discussed entities. Further, the above-discussed entities are only examples of entities with which information may be exchanged, or from which information may be received, and numerous other information entities will be apparent to those of skill in the art having the benefit of the disclosure herein.

As mentioned above with respect to FIG. 5, the databases 554 may include a map data database 556, a time series data database 558, an image data database 560, and a vehicle data database 562. Examples of information that may be maintained in the map data database 556 may include a map of the required FOV for candidate routes, a road profile map or other road profile information, a high definition map of a region in which the vehicle is located, and a standard map of the region in which the vehicle is located. Examples of information that may be included in the time series data database 558 may include information received through the vehicle CAN, vehicle sensor data, traffic data, weather data, and vehicle-to-everything (V2X) data. Examples of information that may be included in the image data database 560 may include infrastructure camera images, user cell phone camera images, and connected automated vehicle (CAV) images. Examples of information that may be maintained in the vehicle data database 562 may include information about individual vehicles such as the vehicle sensor configuration information, vehicle computing device information, vehicle configuration information, vehicle occupant information, history, and preferences, and the like.

Furthermore, at the beginning of a trip, or at any point prior, the vehicle 102 may send, to the service computing device 108, encrypted information about onboard sensor configuration information 528, as well as vehicle configuration information 530, such as ECU information, powertrain and chassis specification, and so forth. In some examples, the vehicle 102 may send this information to the service computing device 108 using a broadcasting protocol such as MQTT, UDP, or the like. Additionally, in some cases, the vehicle 102 may send source location information, such as a current location, and destination location information to the service computing device 108.

At 816, in the data analytics platform 545, the descriptive analytics module(s) 548 may decrypt the received vehicle data such as by using cryptographic hash algorithms such as MD5, SHA-1, SHA256, or any other decryption techniques. Following decryption, the descriptive analytics module(s) 548 may authenticate or otherwise determine the identity of the vehicle and an occupant. For instance, the authentication process may confirm the data has been received from the correct connected vehicle 102 and may validate the integrity of the received data. In addition, the descriptive analytics module(s) 548 may access the vehicle data database 562 to retrieve any information about the vehicle or occupant maintained in the vehicle data database 562. Examples of information that may be retrieved may include the vehicle sensor configuration information 528 and/or vehicle configuration information 530 that may have been previously received for the vehicle 102, as well as user preferences, routing preferences, etc., for an owner of the vehicle or other occupant of the vehicle. Additionally, although not shown in FIG. 3 for clarity of illustration, other processes performed by the data analytics module(s) 548 may include data parsing, data fusion, and the like. For example, a data parsing process may parse an incoming message from the vehicle 102 to a JSON format for further processing, which may include detecting and correcting any corrupt messages sent from the vehicle 102. Further, a data filtering and fusion process may preprocess the data transmitted from the vehicle and update the databases 554 accordingly.

At 818, the descriptive analytics module 548 may determine the vehicle FOV from the vehicle sensor configuration information 528. In some examples, the sensor configuration information 528 may be received from the vehicle 102, while in other examples, the sensor configuration information 528 may be received from the vehicle data database 562. For example, the sensor configuration information 528 may be unlikely to change substantially over time and therefore, having been received previously and stored in the vehicle data database 562, does not need to be transmitted by the vehicle 102 every time a route is to be determined.

At 820, the descriptive analytics module(s) 548 may determine whether a destination location is specified in the received and decrypted vehicle data. If the vehicle destination is available in the decrypted vehicle data, the process goes to 822 to perform routing and monitoring. In some cases, the system may prompt the vehicle occupant for the destination, which may result in the destination being received via voice recognition or other user input. On the other hand, if the vehicle destination is not included in the received information and is not provided by the vehicle occupant, the process may go to 826 to perform the routing and monitoring with prediction of the destination location.

At 822, descriptive analytics module(s) 548 may execute a routing and monitoring algorithm that accepts inputs of vehicle source location, destination location, map, traffic and weather data, and determines candidate routes for the vehicle to reach the destination location. For instance, real-time traffic may be updated using a time loop that executes at a fixed time interval and obtains traffic data from a third party. The traffic data may be ingested in the database and sent to the routing and monitoring algorithm. The routing and monitoring algorithm may be executed by either the descriptive analytics module(s) 548 or the predictive analytics module(s) 550, which may be alternatively invoked based on whether the destination location has been provided or needs to be predicted. If the destination location is not available to the descriptive analytics module(s) 548, the routing and monitoring algorithm may be executed by the predictive analytics module(s) 548 based on use of an AI-based model to predict the destination location, such as by considering the vehicle occupant's history, time of the day, vehicle location, and the like. After the destination location is predicted and, optionally, confirmed by the vehicle occupant, the routing and monitoring algorithm may be executed to generate candidate routes to the destination location as discussed additionally below with respect to 826.

At 824, the descriptive analytics module(s) 548 may further receive the data from the various external sources 802-814, and may perform authentication, filtering, and/or fusing of the received data. For example, the data analytics platform 545 may use data filtering and data fusion to ingest various types of time series and image data obtained from traffic infrastructure, user smartphones, third parties, and so forth. As one example, one or more blockchain networks may be used for exchanging data with at least some of the external sources 802-814. The data may be ingested and stored in the databases 554 or the like. As several non-limiting examples, the data may be managed using a combination of SQL (Structured Query Language) and non-SQL databases for achieving superior real-time performance of the data analytics platform 545.

At 826, in the case that the destination location is not included in the received information received from the vehicle 102, the predictive analytics module(s) 550 may predict the destination location, such as by using a machine learning model, a rule-based model, or the like, and/or based on a vehicle occupant profile, historic trip data, time-of-day, and/or other information stored in the vehicle data database 562. The predicted destination may be sent by the service computing device 108 to a voice assistant or other human-machine interface associated with the vehicle computing device 104. As one example, an interactive voice request may be sent to the vehicle occupant for obtaining confirmation of the predicted destination. The predictive analytics module(s) 550 may receive a confirmation of the predicted destination location or a user input that indicates an alternative destination location. Following determination of the destination location, the predictive analytics module(s) 550 may perform routing and monitoring to determine candidate routes between the source location and the destination location. An example of determining candidate routes is discussed, e.g., with respect to FIG. 11.

At 828, the service computing device may determine a speed profile for each of the candidate routes. The speed profile may be determined to predict vehicle speed for each candidate route and may therefore be performed by the predictive analytics module(s) 550. The speed profile is determined based on the most updated vehicle routes from the routing and monitoring algorithm in the predictive or descriptive analytics layers. For every road segment of the route, the vehicle speed may be predicted using a speed prediction model, which may include one or more of machine-learning models, statistical models, or rule-based models. Additional inputs to the speed prediction model may include real-time traffic and trip history of the current road segment. The real-time traffic speed may be obtained from a third party data provider, such as the map data provider, or the like. The speed profile for the candidate route may be obtained by storing the predicted speed for each road segment in the respective candidate route. Further, this process may be executed for all of the candidate routes.

At 830, after the candidate routes are determined between the source location and the destination location, the computing device may divide the candidate routes into road segments and may determine a POZ for each segment of each candidate route. For example, after the data analytics platform 545 identifies the destination of a connected vehicle, a POZ determination algorithm may be executed to determine an area of a potential obstacle, a sign, a traffic signal, or the like, for each road segment of each of the candidate routes that a fully or partially automated vehicle (which may include a robot, drone, etc.) may need to monitor using its onboard sensors for avoiding a collision, meeting regulations, and ensuring safety. As mentioned above, each candidate route may be divided into multiple road segments, which are the distance between two consecutive waypoints/nodes. Road waypoints or nodes may be defined based on a high definition map or standard map that may be included in the map data database 556. The route waypoints as well as the road segments may be defined by the routing and monitoring process herein. However, determining these features may also be performed by the precautionary observation zone (POZ) process at 830 of FIG. 8. The main task of the POZ process may be to calculate the required observation zone volume for each road segment that an automated vehicle should monitor when traversing a respective road segment.

In some cases, the processes performed by the predictive analytics module(s) 550 may be categorized into two different hierarchical levels. For example, the routing and monitoring 826, precautionary observation zone determination 830, and the speed profile determination 828 may correspond to a first hierarchical level. Furthermore, determination of the computing requirements may correspond to a second hierarchical level. The objective of the processes in the first hierarchical level may be to determine the features that are required for determining the requirements in the second hierarchical level. The computational requirements may then be considered for selecting an optimal route. In addition, in some examples, other parameters may be considered for selecting an optimal route. Examples of such parameters may include determining a safety score, determining efficiency, determining cost, determining distance, determining travel time, determining emissions, and so forth. These parameters may be determined for each of the candidate routes. In some examples, the determined parameters may be provided to the prescriptive analytics module(s) 552 to use as additional factors to consider for identifying an optimal route to the destination in addition to the amount of automated driving time for each candidate route.

At 842, the candidate routes and additional parameters determined by the predictive analytics module(s) 550 may be received at the prescriptive analytics module(s) 552 which may then determine one or more optimal routes. In some examples, the prescriptive analytics module(s) 552 may determine and then output an optimal route based at least on determining the route that maximizes the amount of autonomous driving for the vehicle when traversing the route. In some examples, one or more of the additional parameters discussed above for each candidate route may also be taken into consideration, such as by applying weightings to the various parameters for safety score, efficiency, total travel time, and so forth, in addition to a weighting applied to the amount of autonomous driving. Alternatively, in some examples, a machine learning model may be trained to select the optimal route. As another alternative, vehicle occupant preferences may also receive a weighting. In some examples, the routing recommendation function in the prescriptive layer may consider the speed profile (and thus travel time) for all routes as well as maximum amount of automated driving time for each route, and may select the optimal route for the vehicle based on these considerations. It can be noted that, in addition to speed, other features including vehicle efficiency, vehicle dynamics (to estimate comfort lever), cost, distance, and emission may also be considered when determining the optimal route. In some cases, the routing optimization may be treated as a combinatorial problem in which an exact optimal solution can only be achieved for problems with a small set of parameters. Thus, in practice, heuristics-based approaches may be applied without guaranteed optimality, but may often lead to the best results for production solutions. Some examples herein may employ machine learning to achieve a global/local optimum for routing with large optimization parameter space and with rule-based heuristics to ensure feasible results. For every update of the route for a connected vehicle, the computing device may share the vehicle ID and its status with the nearest VECs of the selected route.

The service computing device 108 may send a selected optimal route to the vehicle computing device 104. The vehicle computing device 104 may provide the selected route to the vehicle control program 524 of the vehicle 102 for use in navigating to the destination location.

At 844, the computing device may send the vehicle ID and a predicted time t to the VECs for the POZs identified along the selected route, and may indicate whether the vehicle will be a resources available vehicle (RAV) or a resources demand vehicle (RDV) when traversing the respective POZ of the respective VEC. In some examples, a threshold may be applied to these designations to account for possible uncertainties such that a vehicle might be designated as RDV to err on the side of safety. For example, even though the vehicle might be determined to just meet the computational requirements, such as by one or several percentage points, or other suitable threshold, the vehicle might still be designated as RDV to provide a safety buffer. As another example, when designating a vehicle as RAV (resources available), a threshold may be applied to ensure that the overcapacity of resources exceeds a threshold such that when the VEC requests the RAV to perform a task, the task does not overwhelm the capacity of the RAV. Thus, the threshold for overcapacity may ensure that RAV is able to provide the requested computational assistance without affecting the RAV's own navigational safety.

Figure 9:
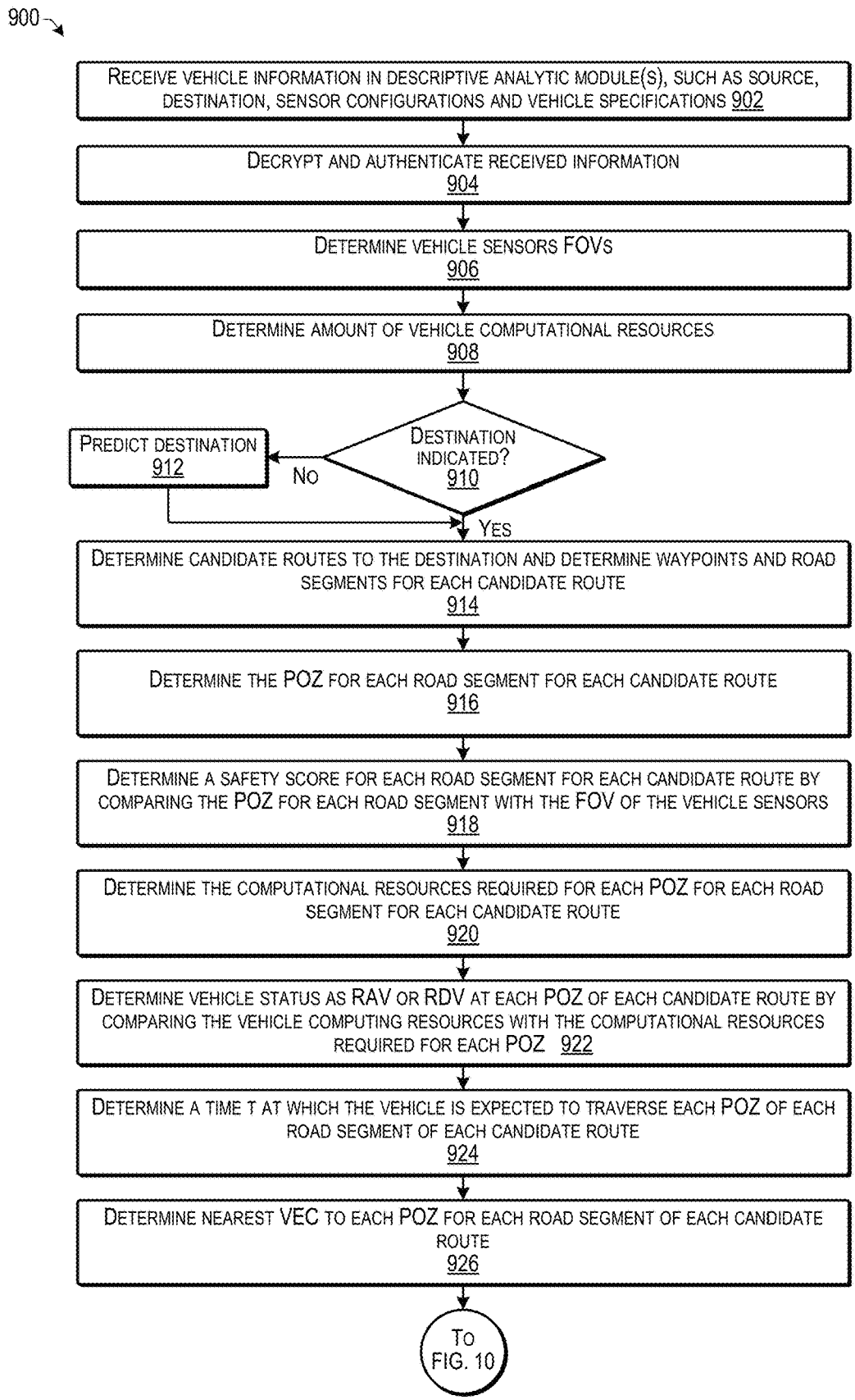
FIG. 9 is a flow diagram illustrating an example process for determining an optimal route from candidate routes according to some implementations.

FIG. 9 is a flow diagram illustrating an example process 900 for determining an optimal route from candidate routes according to some implementations. In some examples, the process 900 may be executed by the system 100 discussed above. For example, the process 900 may be executed by the service computing device 108 executing the navigation information program 546. The process 900 provides additional details to the process 600 discussed above and may be mapped to the data analytics platform 545, such as discussed above with respect to FIGS. 5 and 8.

At 902, the service computing device may receive vehicle information in descriptive analytic module(s), such as source, destination, sensor configurations and vehicle specifications.

At 904, the service computing device may decrypt and authenticate the received information.

At 906, the service computing device may determine vehicle sensors FOVs. For example, the vehicle sensor specifications are sent to the "Vehicle FOV" module to identify the FOV of the vehicle sensors, which is passed to the "Routing & Monitoring" module.

At 908, the service computing device may determine the amount of vehicle computational resources.

At 910, the service computing device may determine whether the vehicle destination was indicated in the received information. If so, the process goes to 914. If not, the process goes to 912. If the vehicle destination is available in the decrypted vehicle data, then the routing and monitoring module in descriptive analytics accepts inputs of vehicle location, destination, map, traffic and weather data and determines potential routes for the vehicle to reach its destination.

At 912, the service computing device may predict the destination based on prior trips, time of day, day of the week, or the like. Alternatively, an inquiry may be sent to the vehicle occupant.

At 914, the service computing device may determine candidate routes to the destination and may determine waypoints and road segments for each candidate route. An example of determining candidate routes is discussed below with respect to FIG. 11. In some cases, the routing and monitoring module may receive inputs of real-time traffic and confirmed destination inputs for route prediction. The real-time traffic is updated using a time loop that executes at fixed time intervals and obtains traffic data from 3rd parties, this traffic data is ingested in the database and sent to the routing and monitoring module. Once the destination has been finalized either by descriptive or predictive routing and monitoring module, candidate routes from start to destination are calculated in the routing and monitoring module using a routing engine. The candidate routes are subsequently sent to the POZ determination function and a speed profile determination function in the predictive layer.

At 916, the service computing device may determine the POZ for each road segment for each candidate route. An example is discussed below with respect to FIGS. 12-14. For example, the POZ may be the part of the road segment that the automated vehicle needs to monitor when traversing the road segment.

At 918, the service computing device may determine a safety score for each road segment for each candidate route by comparing the POZ for each road segment with the FOV of the vehicle sensors. The safety score indicates how much percentage of each POZ can be covered by vehicle sensor FOV. For automated driving, the vehicle FOV should cover the entire POZ. In case the vehicle FOV cannot cover the POZ for a particular road segment, the computing device may determine the time when the vehicle is expected to traverse the particular road segment and communicates with the VEC to the particular road segment to determine whether the VEC will be able to support the vehicle to realize automated driving for that particular road segment.

For instance, when the vehicle sensor FOV does not cover the POZ for a particular road segment, the computing device determines the area of the POZ where the vehicle's onboard sensors are not able to monitor and require external support for monitoring that area of the POZ. The computing device checks whether there are corresponding infrastructure sensors in the location of the POZ that may be accessed and used by a VEC for performing sensing of the uncovered area. The computing device may also check whether a corresponding road segment has any additional sensor data for the uncovered area of the POZ where the connected vehicle needs support. If the VEC is able to access the necessary sensor information for the uncovered region of the POZ, the computing device may send a request to the particular VEC to request that the VEC assist the vehicle during traversal of that road segment. In the case that the VEC does not have access to sensor information for the uncovered region of the POZ of the road segment, but the service computing device does have access to the necessary images, features, and/or detection data, the service computing device may provide this data to the particular VEC for the VEC to process the data for supporting the vehicle for automated driving on the road segment. In the situation that both the VEC and the service computing device do not have access to sensors that cover the uncovered portion of the POZ, the computing device may calculate the safety score and indicate that manual driving should be performed for that road segment. For example, the safety score of a road segment becomes maximum if full sensor coverage and data processing is possible for the POZ for that road segment to realize automated driving, either through coverage by the FOV of the onboard sensors, or by coverage of the FOV of the onboard sensors in combination with the coverage provided by external sensors with data processed by the VEC or the like.

At 920, the service computing device may determine the computational resources required for each POZ for each road segment for each candidate route. For example, the computing device may calculate computing requirements of the vehicle by considering requirements for POZ detection, recognition, path planning, vehicle control, and so forth, for automated driving on that road segment. In addition to processing of the onboard sensor data, the computing requirement may also consider additional connected data from the external computing devices and/or other vehicles that may need to be processed for automated driving perception requirements.

At 922, the service computing device may determine vehicle status as RAV or RDV at each POZ of each candidate route by comparing the vehicle sensor and computing resources with the resources required for each POZ. For example, the computing device may compare the computing requirement with the available computing resources on the vehicle, classifies the vehicle into one of at least two categories for each road segment, namely resource demand vehicle (RDV) or a resource available vehicle (RAV). In some cases, a third category may be included, e.g., a resources met vehicle (RMV) that does not require assistance for navigation, but that also does not have available resources to share with the VEC. An RDV needs to have some sensing and/or computation tasks performed by external devices to enable the RDV to execute required vehicle functions in real time for autonomous driving to traverse a particular road segment. An RAV may be requested to utilize its available resources to perform tasks for an RDV or for a VEC for the specific road segment. An RMV may be a vehicle in which there is insufficient overcapacity of resources to meet the overcapacity threshold mentioned above, and may only have a sufficient amount of resources to execute the required task for automated driving along the particular road segment.

At 924, the service computing device may determine a time t at which the vehicle is expected to traverse each POZ of each road segment of each candidate route.

At 926, the service computing device may determine the nearest VEC to each POZ for each road segment of each candidate route.

Figure 10:
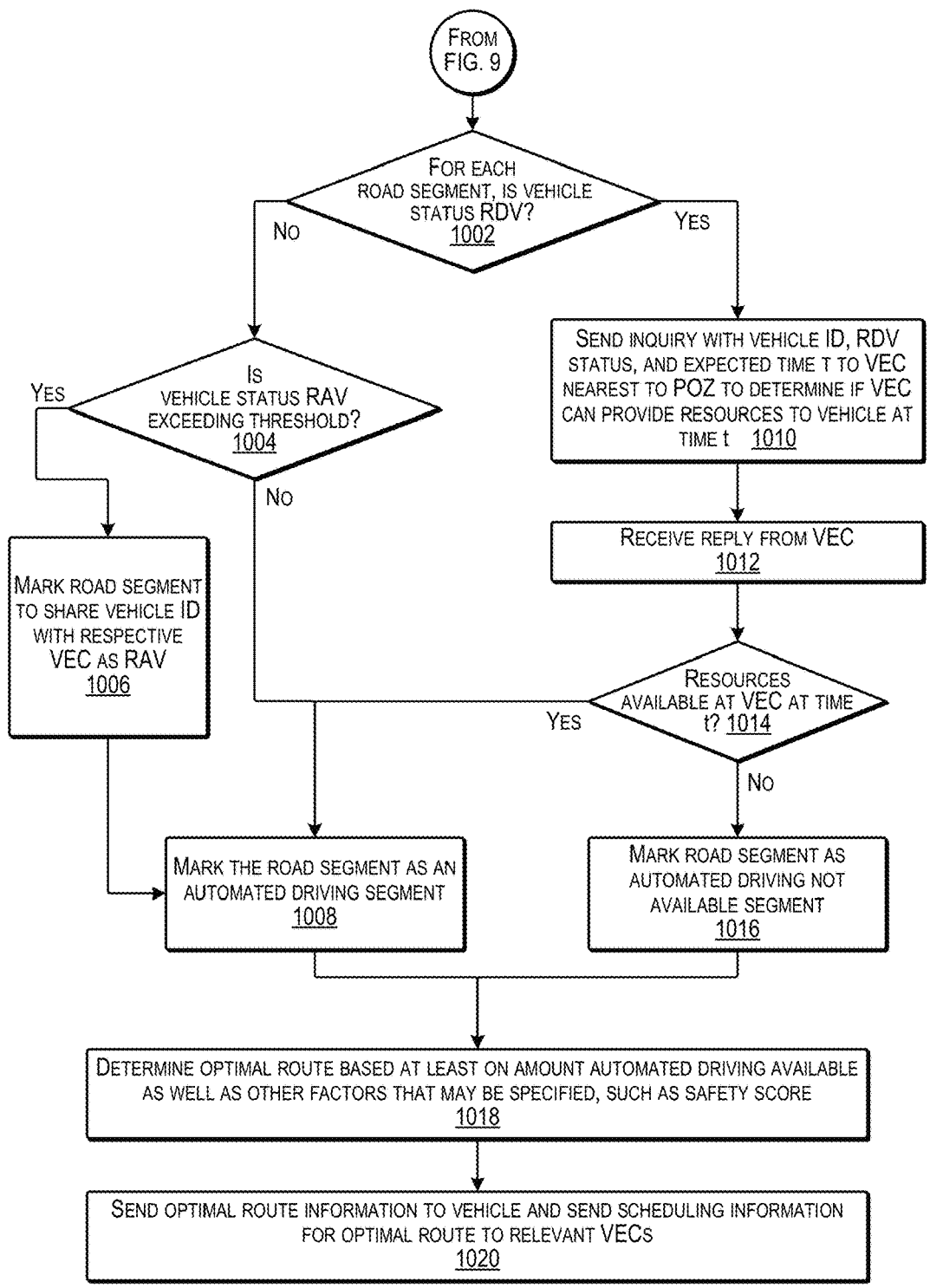
FIG. 10 is a flow diagram that illustrates a continuation of the process of FIG. 9 according to some implementations.

FIG. 10 is a flow diagram that illustrates a continuation of the process 900 of FIG. 9 according to some implementations.

At 1002, the service computing device may determine, for each road segment of each candidate route, whether the vehicle status is RDV (resource demand vehicle). If so, the process goes to 1010. If not, the process goes to 1004.

At 1004, the service computing device may determine whether the vehicle's RAV status exceeds a threshold. For example, the amount of resources available on the vehicle may be required to exceed more than a threshold amount for the VEC to employ the resources of the vehicle with RAV status. If so, the process goes to 1006. If not, the process goes to 1008.

At 1006, the service computing device may mark the road segment to share the vehicle ID and time t with the respective VEC as an RAV (resource available vehicle) able to share resources. For example, based on the time that the vehicle is calculated to traverse the road segment, the computing device may share the vehicle computing resource status with the VEC. If the vehicle status is RAV, the nearest VEC of the corresponding road segment may list the vehicle ID and may consider utilizing that available resource as part of VEC capacity while the vehicle is traversing the road segment.

At 1008, the service computing device may mark the road segment as an automated driving segment (corresponding to a highest safety score).

At 1010, the service computing device may send, to the VEC nearest to the POZ, an inquiry with the vehicle ID, RDV (resource demand vehicle) status, and expected time t at which the vehicle is expected to traverse the POZ to determine if the VEC can provide resources to vehicle at time t. For example, when the vehicle status for the road segment is indicated to RDV, the computing device shares the vehicle ID with the nearest VEC to the road segment to check whether the VEC has available resources to support the vehicle for automated driving.

At 1012, the service computing device may receive a reply from the VEC. If the VEC has available resources at the calculated time t to support the vehicle, the computing device lists that road segment as an automated driving road segment. Otherwise, the road segment will be listed as a non-automated or manual driving road segment.

At 1014, the service computing device may determine whether the VEC indicated that sufficient resources are available at the VEC for the vehicle at the time t? If so, the process goes to 1008. If not, the process goes to 1016.

At 1016, the service computing device may mark the road segment as a segment at which automated driving is not available.

At 1018, the service computing device may determine an optimal route for the vehicle based at least on the amount of automated driving available, as well as other factors that may be specified, such as safety score. As one example, the computing device may select the route that has the highest percentage of automated driving time.

At 1020, the service computing device may send the optimal route information to the vehicle and send scheduling information for the optimal route to relevant VECs.

Figure 11:
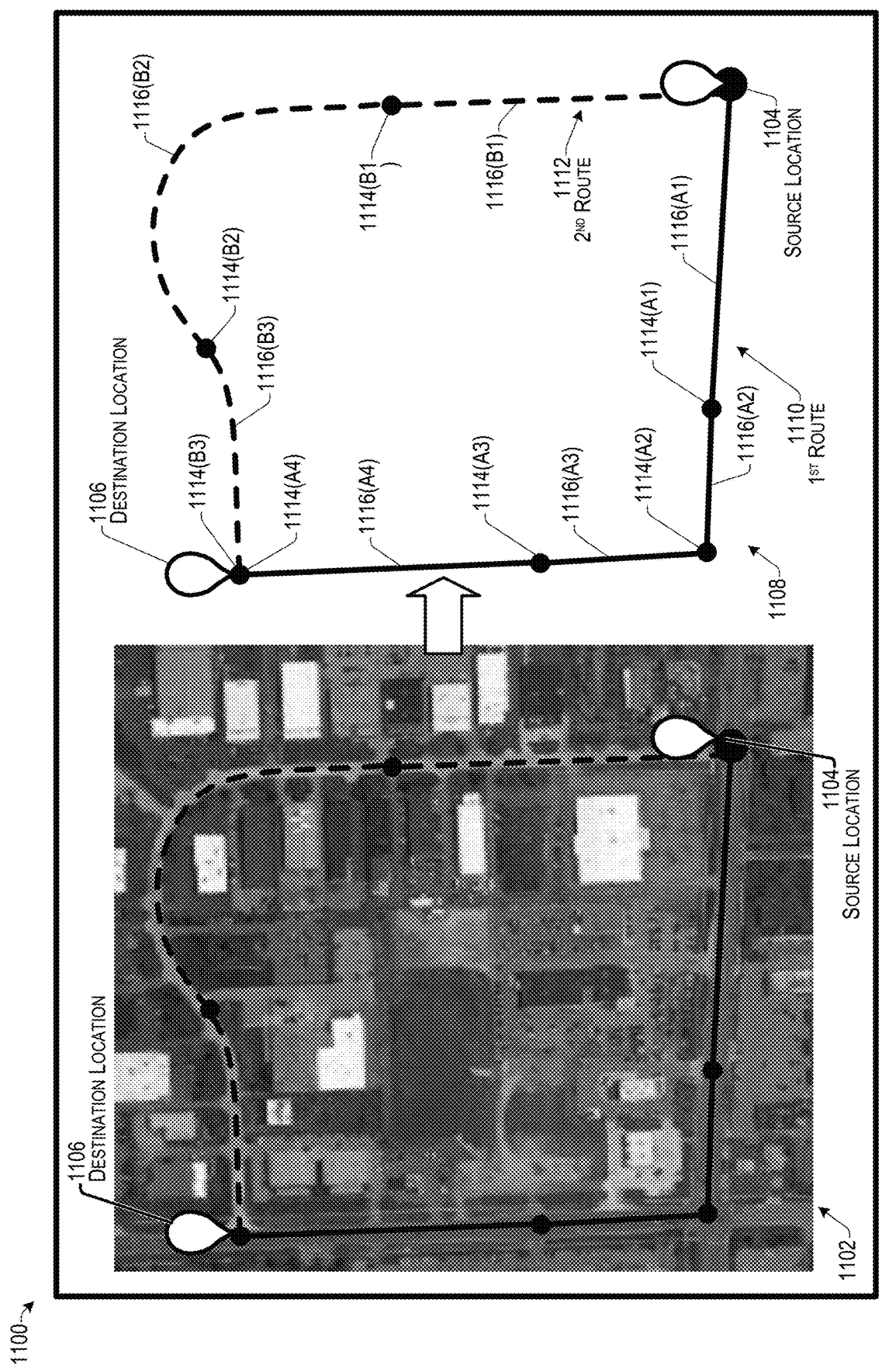
FIG. 11 illustrates an example of determining candidate routes between a source location and a destination location according to some implementations.

FIG. 11 illustrates an example 1100 of determining candidate routes between a source location and a destination location according to some implementations. In this example, as shown on a map 1102, a source location 1104 and a destination location 1106 may be initially determined, e.g., as discussed above. For example, after the source location 1104 and the destination location 1106 have been set, a plurality of feasible candidate routes 1108 may be determined In this example, two feasible candidate routes 1108 are illustrated, namely a first route 1110 and a second route 1112. In other examples, more or fewer candidate routes may be determined In addition, in the case that there are a very large number of feasible candidate routes, the number of candidate routes may be narrowed using any of various thresholds such as estimated distance traveled along each route, estimated time of travel for each route, or the like. In some cases, the narrowing criteria may be based at least in part on user preferences.

Each route 1110 and 1112 may be divided into a plurality of segments based on waypoint nodes 1114 and intervening road segments 1116, which are the distance between two waypoints 1114. The locations of the waypoints 1114 and the length of each road segment 1116 may depend in part on the types of roads to be traversed. For instance, road segments 1116 may vary from less than a meter to several hundred meters or more. In some cases waypoints 1114 may correspond to intersections however this is not necessarily always the case, such as in the case of long stretches of road that may be broken into shorter road segments despite not having any intersections.

In the illustrated example, the first route 1110 is divided into four road segments including waypoints 1114(A1), 1114(A2), 1114(A3), and 1114(A4), and road segments 1116(A1), 1116(A2), 1116(A3), and 1116(A4). In addition, the second route 1112 is divided into three road segments including waypoints 1114(B1), 1114(B2), and 1114(B3), and road segments 1116(B1), 1116(B2), and 1116(B3). As mentioned above, in other examples, a different number of waypoints and road segments might be used for each of the routes 1110, 1112. Furthermore, while the map 1102 is illustrated in FIG. 11 for discussion purposes, in operation it may not be necessary for the service computing device 108 to generate a visual map for performing the identification and analysis of the selected routes and road segments.

The data analytics platform 545 may store data in advance for each waypoint 1114 and/or road segment 1116 for all candidate routes or at least the most feasible candidate routes within a geographic region. For example, the data analytics platform 545 may analyze maps of geographic regions in advance for determining routes and possible waypoints and road segments on the roads included in each map. This information may be stored in the map data database 556 discussed above with respect to FIGS. 5 and 8 in advance of receiving a request for route guidance from a vehicle.

Furthermore, for the determined road segments 1116 identified in each map, the data analytics platform 548 may determine in advance and store the POZ for each respective road segment 1116. For example, once the road segments for each route have been calculated, the data analytics platform 545 may calculate the number of road intersections and corresponding intersection functional areas. In the examples herein, an intersection may include two areas: a physical area of intersection and a functional area of intersection. The POZ may be calculated for each intersection, and may include a 3D zone that should be monitored by a human driver or vehicle sensors when navigating on that respective road segment 1116. For instance, an autonomous vehicle may be expected to monitor the POZ for safely driving autonomously on the respective road segment 1116.

In this routing example, as discussed additionally below, for the first route 1110 and the second route 1112, the data analytics platform 545 may execute the POZ determination process in the analytics layer to determine the POZs for each segment of each route 1110, 1112. The vehicle sensor FOV may be calculated by the data analytics platform 545 based on the vehicle onboard sensor configuration information 528 received by the data analytics platform 545 for the vehicle 102, such as discussed above with respect to FIG. 8.

Figure 12A:
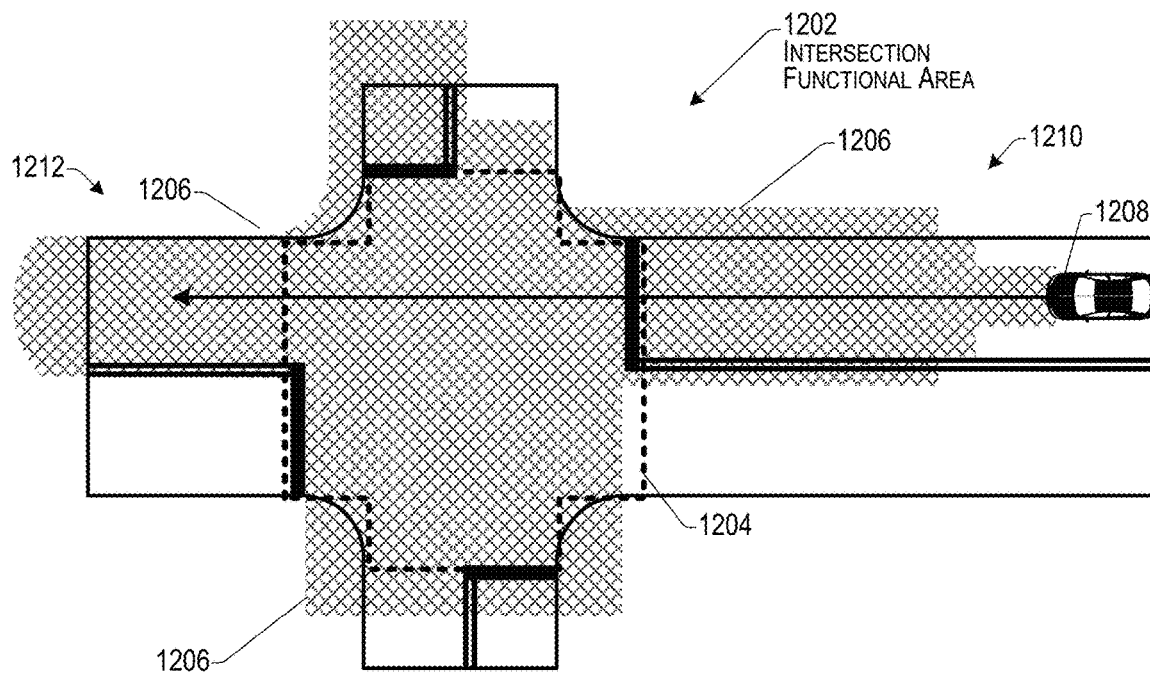
FIGS. 12A and 12B illustrate examples of intersections according to some implementations.
Figure 12B:
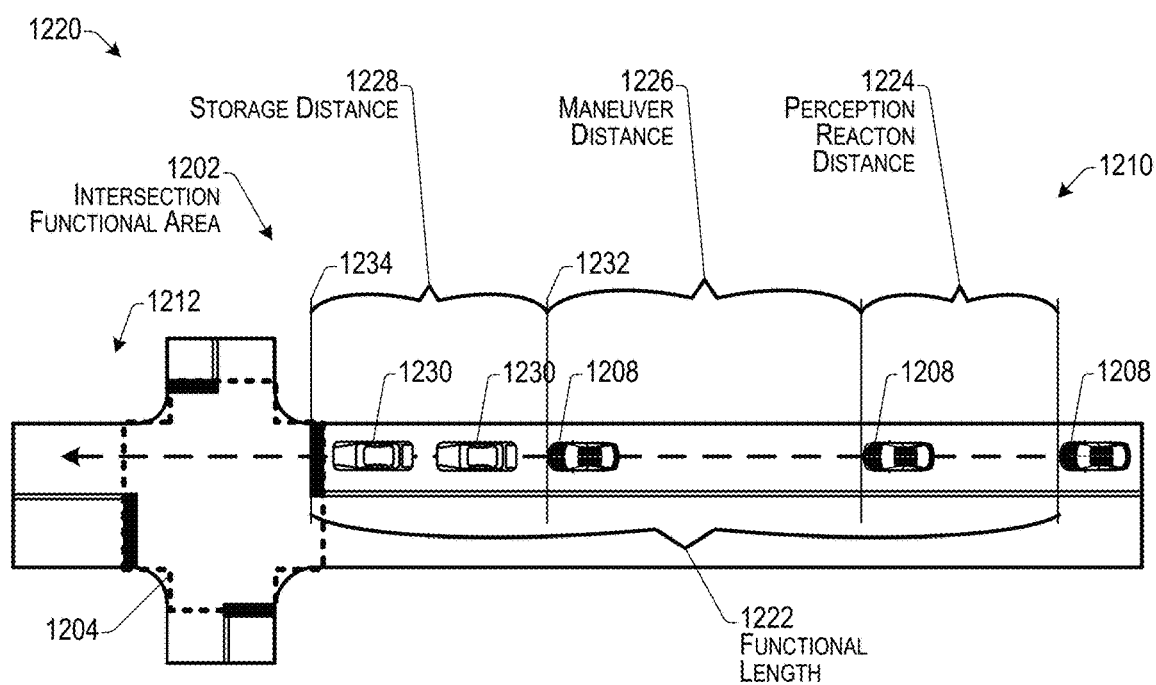

FIGS. 12A and 12B illustrate examples of intersections according to some implementations. FIG. 12A illustrates an example intersection 1200 according to some implementations. The intersection 1200 includes an intersection functional area 1202 indicated by cross hatching. The intersection functional area 1202 may include the crosshatched region that includes both an intersection physical area 1204 of the intersection (indicated by dashed line), and the additional areas 1206 outside of the intersection physical area 1204 in which a vehicle 1208 may maneuver. Thus, the intersection physical area 1204 may correspond to the fixed area within the four corners of the intersection 1200. On the other hand, the overall functional area 1202 may be variable and may include an upstream portion 1210 and a downstream portion 1212 as shown in FIG. 12B.

FIG. 12B illustrates an example intersection 1220 according to some implementations. As mentioned above, contrary to the fixed physical area 1204 of the intersection 1220, the intersection functional area 1202 is variable and includes both upstream portion 1210 and downstream portion 1212 in addition to the physical area 1204. The upstream area 1210 of the intersection functional area 1202 includes a functional length 1222. The functional length 1222 may be divided into several portions, such as when a vehicle 1208 approaches the intersection 1220 and during which the vehicle 1208 decelerates and comes to a complete stop. These portions include a perception reaction distance 1224 and a maneuver distance 1226. In addition, the functional length 1222 may include a storage distance 1228, which may be a portion of the intersection functional area 1202 in which other vehicles 1230 are queued.

Realizing safety at intersections may be accorded a high priority as accidents mostly happen at intersections. At the intersection, a human driver may understand where to make the lane changes, when and how to read the traffic light, location to stop, where to watch before making a turn, when and speed to make the turn, etc. An automated vehicle should have the ability to follow the sequential steps and observe the proper region to make human-like decisions. Thus, an automated vehicle should understand the different regions at intersections, such as those specified by government, local authorities, etc., and perform the same action for each region as a human driver would. The intersection functional area calculation may depend on the road speed limit, location, type of road, etc. which may be defined by designated authorities in each country. In the USA, according to the AASHTO (American Association of State Highway and Transportation Officials) intersection functional length (F) is the sum of stopping sight distance (S) plus the storage length distance (Q) as shown in EQ(1). In case there is no traffic, storage length (Q) becomes zero and intersection functional area becomes the stopping sight distance. The stopping sight distance is the combination of the distances traveled by a vehicle during two phases to stop the vehicle, i.e., a first phase is the perception reaction distance 1224 traveled during perception reaction time and the second phase is the maneuver distance 1226 traveled during a maneuver time:

$$F = S + Q \quad \text{EQ(1)}$$

$$S = (1.47 * V * t) + 1.075 * (V^2/a) \quad \text{EQ(2)}$$

where,
F=Intersection functional length
S=Stopping sight distance
Q=Storage or queue length
V=Design speed (mph)
t=Perception reaction time (2.5 Sec)
a=Deceleration rate (within 11 to 15 ft/sec$^2$, e.g., 11.2 ft/sec$^2$).

The first part of EQ(2) indicates the distance covered during the perception reaction time during which the driver traverses the perception reaction distance 1226, realizes that a decision is needed, and decides what kind of maneuver is appropriate. The perception reaction time may typically be about 2.5 seconds, which includes about 1.5 seconds for perception and about 1.0 seconds for reaction. The second part of EQ(2) indicates the distance traveled by the driver during the maneuver distance for decelerating the vehicle and coming to a complete stop, e.g., at 1232 when there are other cars 1203 in the storage distance 1228, or at 1234 when there are no other cars in the storage distance 1228.

Figure 13:
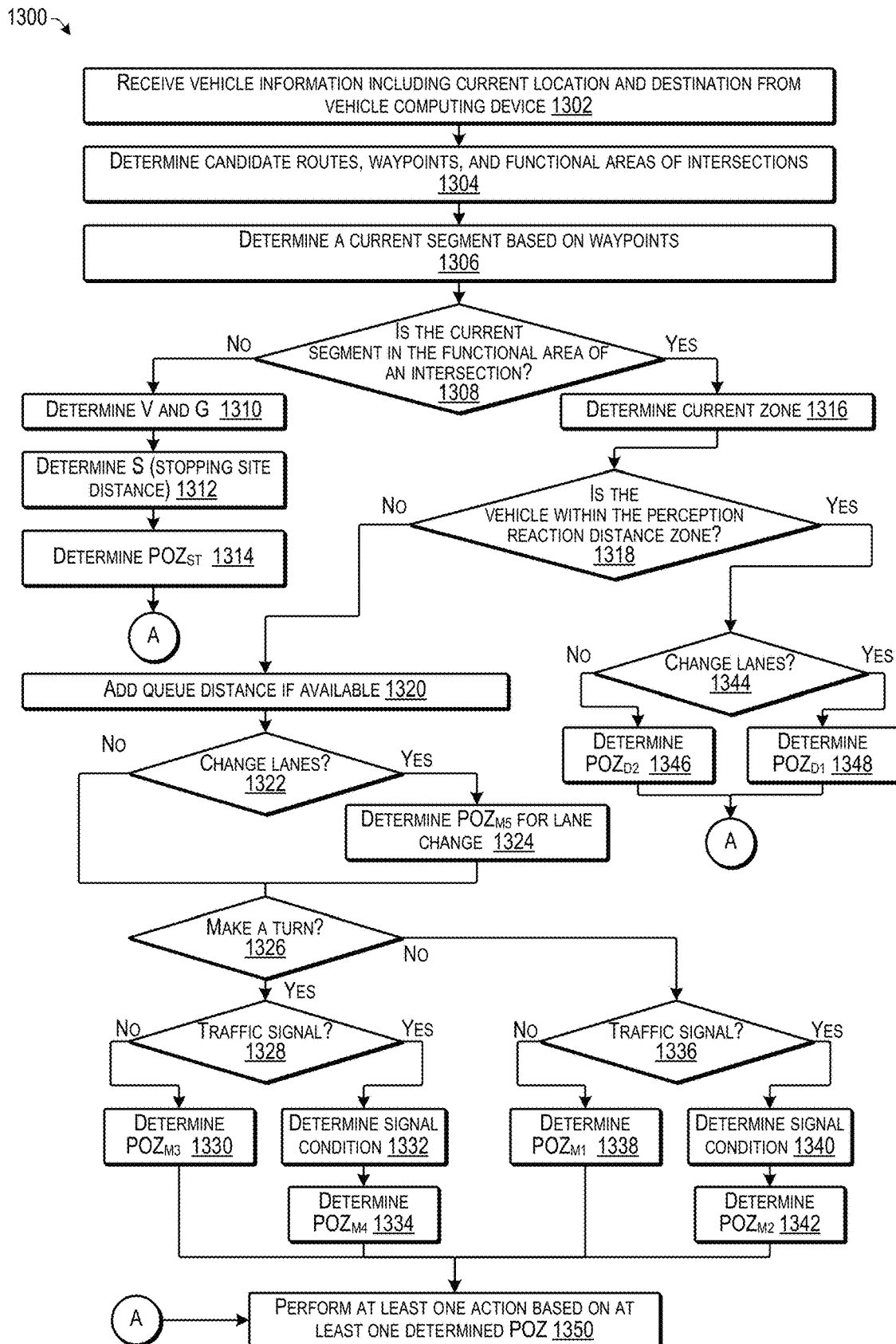
FIG. 13 is a flow diagram illustrating an example process for determining POZs for various different criteria according to some implementations.

FIG. 13 is a flow diagram illustrating an example process 1300 for determining POZs for various different criteria according to some implementations. In some examples, the process 1300 may be executed by the system 100 discussed above. For example, the process 1300 may be executed by the data analytics platform 545, such as the service computing device(s) 108 executing the navigation information program 546 in some examples. Once a connected vehicle shares its current location and destination, the corresponding road segments may be calculated by the data analytics platform 545 for all the candidate routes to the destination location. The road segments may be divided into two categories: (1) road segments outside of any intersection functional area and (2) road segments inside of an intersection functional area. The POZ determining process 1329 of the predictive data analytics layer may first identify the type of road segments and may then calculate the POZ for that road segment. The system may determine at least one POZ for each road segment of each candidate route.

At 1302, the service computing device 108 may receive vehicle information including current location and destination from the vehicle computing device.

At 1304, the service computing device 108 may determine candidate routes, waypoints, and functional areas of intersections.

At 1306, the service computing device 108 may determine a current segment based on waypoints.

At 1308, the service computing device 108 may determine whether the current segment is in the functional area of the intersection. If so, the process goes to 1316. If not, the process goes to 1310.

At 1310, the service computing device 108 may determine V (design speed) and G (road grade) for the current segment.

At 1312, the service computing device 108 may determine the stopping sight distance S based on the values for V and G determined at 1310 (see EQ(5) below).

At 1314, the service computing device 108 may determine POZ$_{ST}$ for the current segment (e.g., segment is outside intersection functional area).

At 1316, when the current segment is in the functional area of an intersection the service computing device 108 may determine a current zone of the functional area, e.g., the perception reaction distance zone, the maneuver distance zone, or the storage distance zone.

At 1318, the service computing device 108 may determine whether the vehicle is within the perception reaction distance zone. If so, the process goes to 1344. If not, the process goes to 1320.

At 1320, when the vehicle is within the functional area of the intersection but not within the perception reaction distance zone, the service computing device 108 may add the storage queue distance if available.

At 1322, the service computing device 108 may determine whether the vehicle should change lanes, such as based on the intended destination. If so, the process goes to 1324. If not, the process goes to 1326.

At 1324, if the vehicle should change lanes, the service computing device 108 may determine POZ$_{MS}$ for the lane change (e.g., lane change inside functional area of intersection).

At 1326, the service computing device 108 may determine whether the vehicle should make a turn. If so, the process goes to 1336. If not, the process goes to 1338.

At 1328, if the vehicle will be making a turn at the intersection, the service computing device 108 may determine whether there is a traffic signal. If so, the process goes to 1332. If not, the process goes to 1330.

At 1330, when there is not a traffic signal, the service computing device 108 may determine $POZ_{M3}$ for the intersection (e.g., turn at intersection with no traffic signal).

At 1332, when there is a traffic signal, the service computing device 108 may determine the condition of the traffic signal.

At 1334, based on the determined condition of the traffic signal, the service computing device 108 may determine $POZ_{M4}$ for the intersection (e.g., turn at intersection with traffic signal).

At 1336, if the vehicle will not be making a turn at the intersection, the service computing device 108 may determine whether there is a traffic signal. If so, the process goes to 1340. If not, the process goes to 1338.

At 1338, when there is not a traffic signal, the service computing device 108 may determine $POZ_{M1}$ for the intersection (e.g., no turn at intersection with no traffic signal).

At 1340, when there is a traffic signal, the service computing device 108 may determine the condition of the traffic signal.

At 1342, based on the determined condition of the traffic signal, the service computing device 108 may determine $POZ_{M2}$ for the intersection (e.g., no turn at intersection with traffic signal).

At 1344, when the vehicle is within the perception reaction distance zone, the service computing device 108 may determine whether the vehicle should change lanes. If so, the process goes to 1348. If not, the process goes to 1346.

At 1346, when the vehicle was not going to change lanes, the service computing device 108 may determine $POZ_{D2}$ for the current lane (e.g., no lane change).

At 1348, when the vehicle is going to change lanes, the service computing device 108 may determine $POZ_{D1}$ for the new lane (e.g., change lanes).

At 1350, following determination of the POZ at one of 1330, 1334, 1338, 1342, 1346, or 1348, the service computing device 108 may perform at least one action based on at least the POZ, such as sending at least one signal, determining a POZ for a next segment of the candidate route, or the like.

Further, while examples of determining POZs have been provided herein, additional examples are provided in U.S. patent application Ser. No. 17/476,529, filed on Sep. 16, 2021, and which is incorporated by reference herein.

Figure 14:
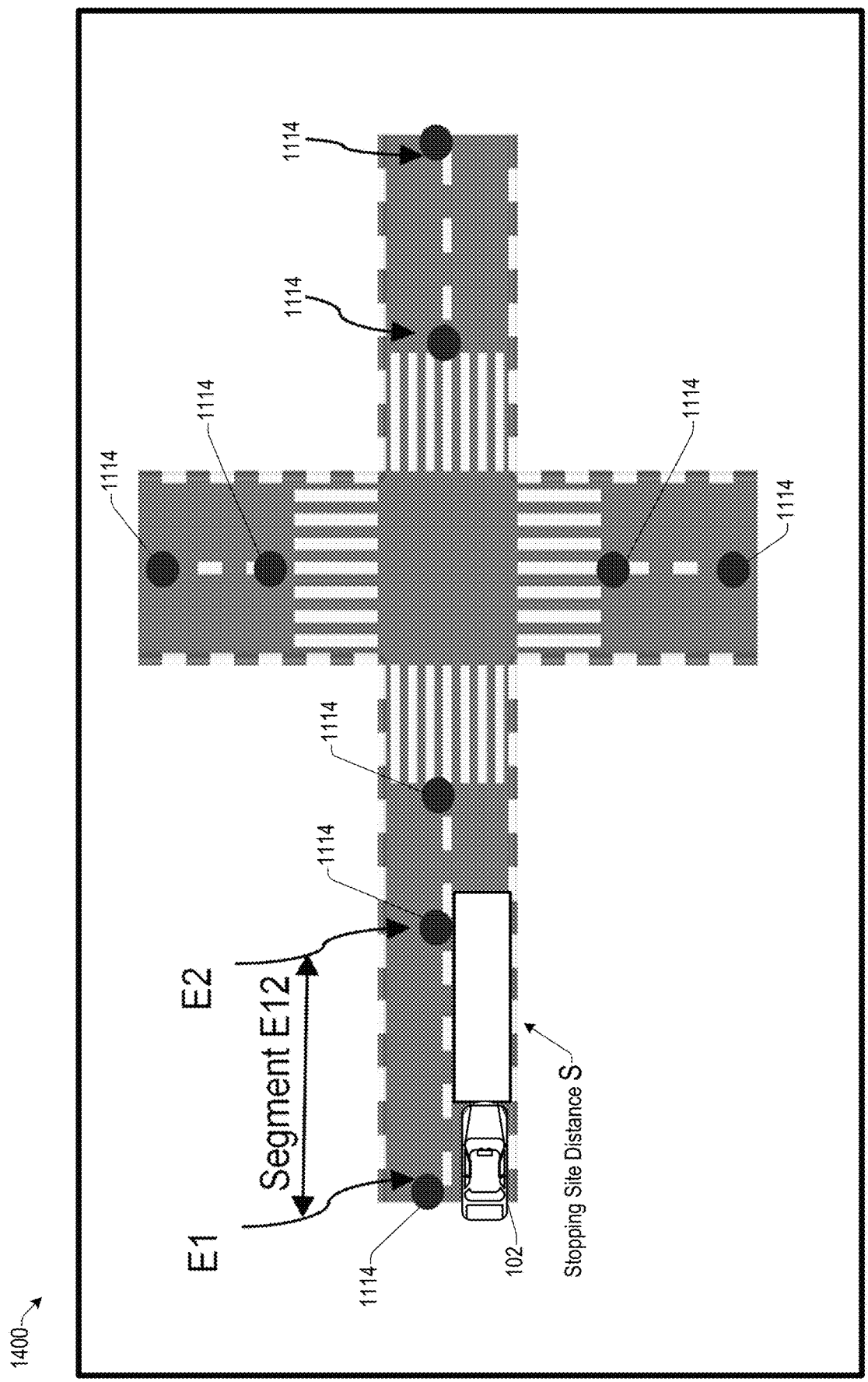
FIG. 14 illustrates an example of determining a POZ in which a current road segment falls outside of an intersection functional area according to some implementations.

FIG. 14 illustrates an example 1400 of determining a POZ in which a current road segment falls outside of an intersection functional area according to some implementations. In this example, the vehicle 102 is located between a first waypoint 1114 designated as E1 and a second waypoint 1114 designated as E2. A plurality of other waypoints 1114 are also illustrated in this example. Accordingly a road segment between the waypoints E1 and E2 may be designated as segment E12 in this example. Further, suppose that the road segment E12 is located outside the intersection functional area discussed above with respect to FIGS. 12A and 12B. When a road segment is located outside of an intersection functional area, stopping sight distance S for that road segment may be calculated as shown in EQ(3):

$$S=(1.47*V*t)+1.075*(V^2/a) \qquad EQ(3)$$

where,
S=Stopping sight distance
V=Road design speed (mph)
t=Perception reaction time
a=Deceleration rate In addition, EQ(3) can be rewritten as shown in EQ(4) based on the typical values of t=2.5 sec and a=11.2 ft/sec²:

$$S=3.675*V+0.096*V^2 \qquad EQ(4)$$

Additionally, in the situation that the road is on a grade G, the stopping sight distance S can take the grade into consideration and may be calculated as shown in EQ(5):

$$S=3.675*V+V^2/[30((a/32.2)\pm G/100)] \qquad EQ(5)$$

In some cases, the road design speed V and road grade G can be either stored in the data analytics platform 545 database(s) 554 for all routes or can be collected in real-time through third party services. Once the stopping sight distance S is calculated, the three-dimensional (3D) region of $POZ_{ST}$ for the road segment outside the intersection functional area may be calculated as shown in FIG. 15 below, such as based on a lane width of 12 feet and a height of 3.5 ft.

Figure 15:
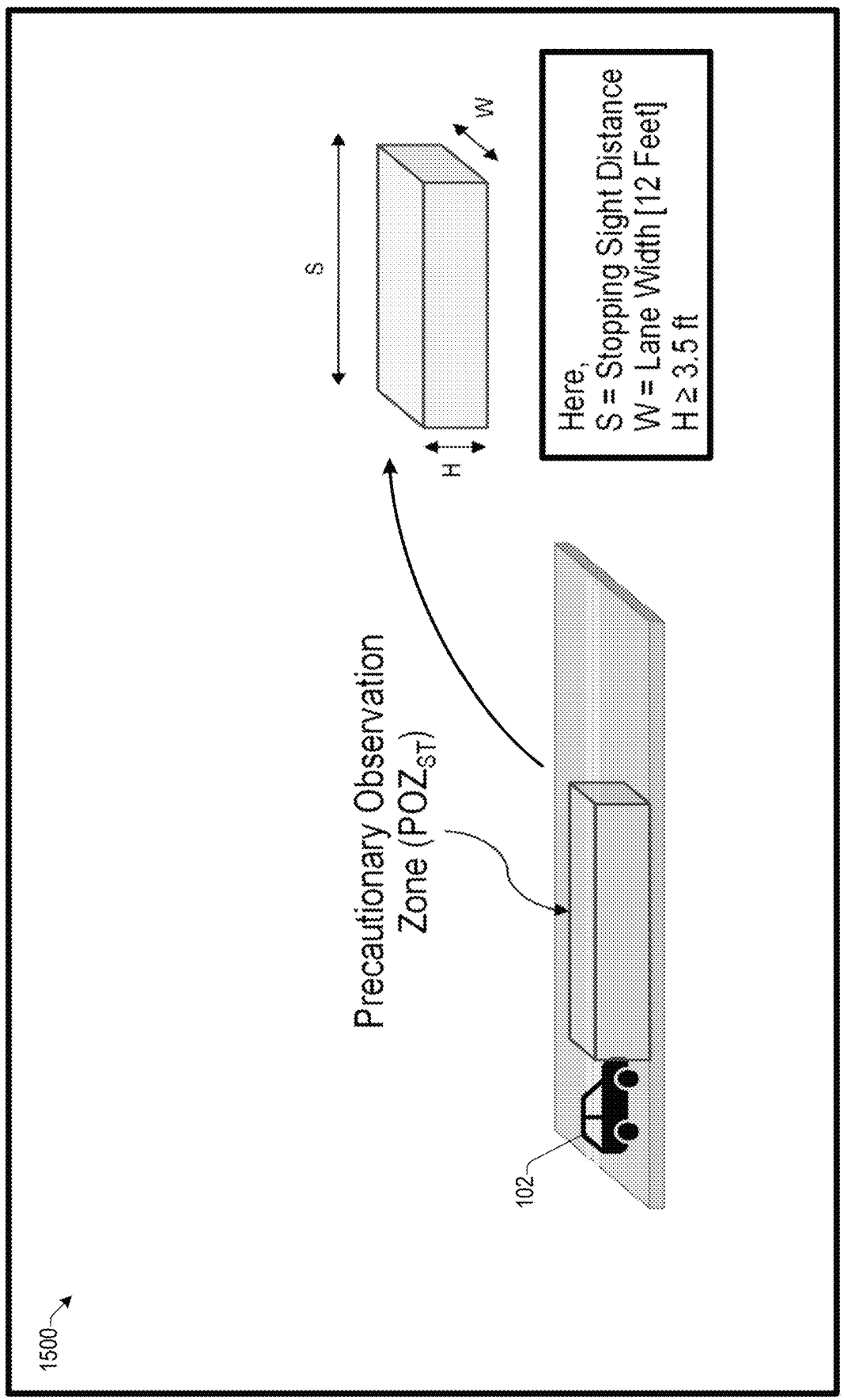
FIG. 15 illustrates an example of determining a POZ according to some implementations.

FIG. 15 illustrates an example 1500 of determining a POZ according to some implementations. In this example, for road segments outside of intersection functional areas, the POZ is designated as $POZ_{ST}$, and may be determined as a volume in 3D space having a length corresponding to the stopping site distance S determined above with respect to FIG. 14; a width W corresponding to the width of the travel lane in which the vehicle 102 is traveling (or will travel), which in this example is a default value of 12 feet; and a height H, which in this example is a default height greater than or equal to 3.5 feet. In some examples, the height H may vary based on any of various factors, such as height of the vehicle, height of expected obstacles, signs, or signals, and so forth.

If a road segment falls inside of an intersection functional area, the next step is to identify its location on decision distance zone or ahead of the decision distance zone (maneuver and storage zone). In case the road segment is within decision distance zone of the intersection functional area, the system may identify whether the vehicle needs to make a lane change or not based on the next segments of destination routes. three-dimensional $POZ_{D1}$ and $POZ_{D2}$ for the current segment may be calculated considering 12 ft width of lane and 3.5 ft height of driver eye distance from road.

In case the current segment is ahead of the decision distance zone, it is considered to be in the maneuver distance zone. Note that, based on the road type, location and/or traffic, etc. storage length or queue length might be added in some intersections. The storage length of any intersection can be calculated based on the traffic history data. Additionally, storage length can be predicted for any time on the day based on the infrastructure sensor or camera data. Thus, once the current segment is within the intersection functional area but not within the decision distance zone, the queue length may be added if available. Consequently, the POZ may be calculated considering necessity of (further) lane change, making a turn or not, traffic signal intersection or sign-based intersection, etc. As explained above, e.g., with respect to FIG. 8, the POZ may be calculated in the predictive analytics layer for all road segments of all candidate routes. The POZ calculation can be done either in sequential or parallel computing modes. The POZs for the road segments may be stored in the map data database for future use. In this case, the POZ of any road segment immediately available in the map data database, and the system utilizes the stored POZs. The POZs determined for the respective road segments may be used to calculate the safety score for each road segment.

To calculate the safety score, the 3D POZs of the road segments for every candidate route may be compared with vehicle sensor FOV. For each road segment, the percentage of 3D POZ covered (overlapped) by the vehicle sensor FOV is calculated. An average safety score percentage may be calculated for each candidate route by averaging the calculated percentage of overlap of the FOV for POZs of all road segments for that candidate route. This average percentage indicates the safety score of the entire route.

Figure 16:
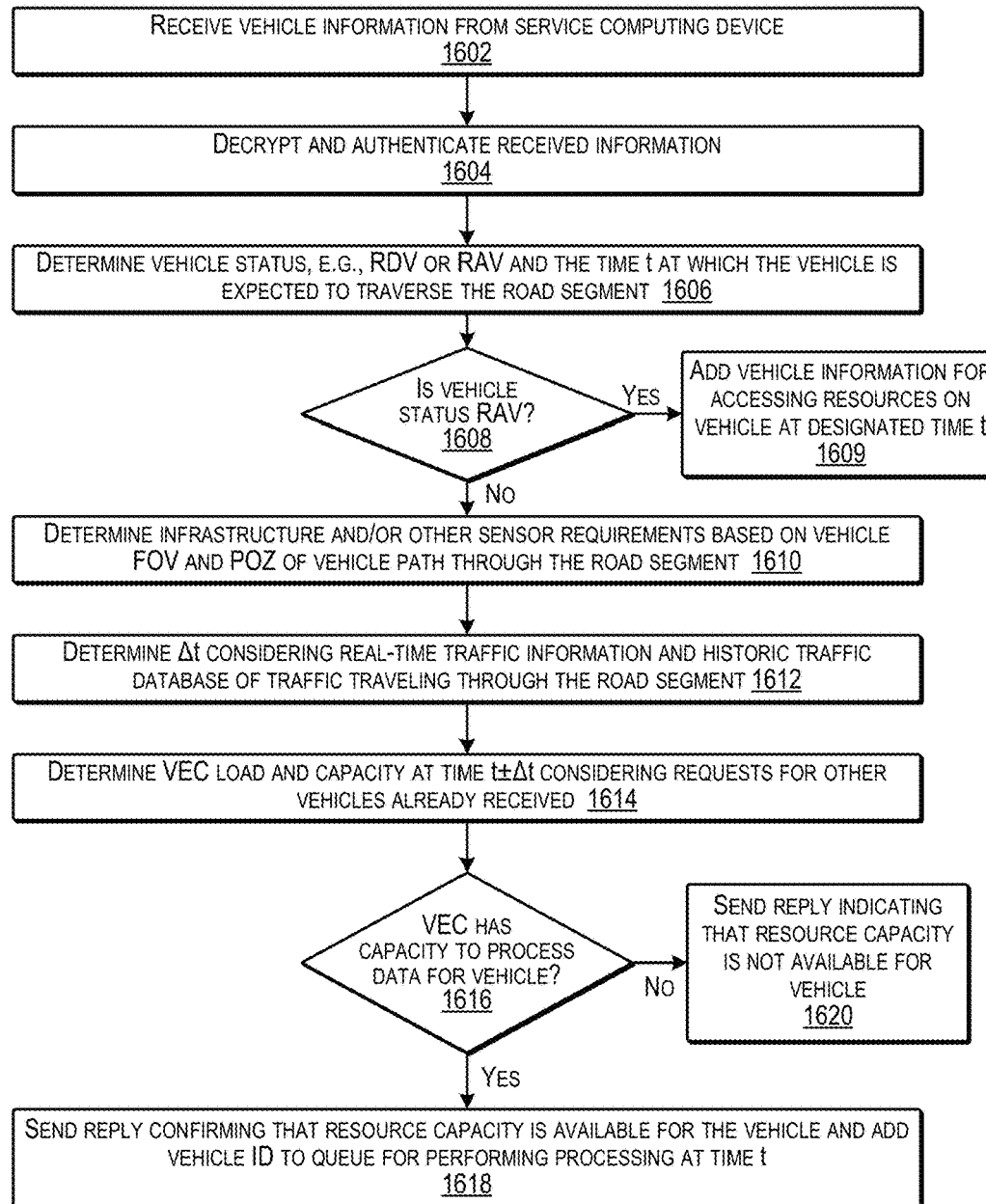
FIG. 16 is a flow diagram illustrating an example process for determining whether a VEC is able to provide resources to a vehicle according to some implementations.

FIG. 16 is a flow diagram illustrating an example process 1600 for determining whether a VEC is able to provide resources to a vehicle according to some implementations. In some examples, the process 1600 may be executed by the VECs 105 discussed above. For example, the process 1600 may be executed by the VEC 105 executing the data processing program 596.

At 1602, the VEC may receive vehicle information from the service computing device for a vehicle that may traverse a road segment near the VEC.

At 1604, the VEC may decrypt and authenticate the received information about the vehicle.

At 1606, the VEC may determine the vehicle status, e.g., RDV or RAV and the time t at which the vehicle is expected to traverse the road segment and POZ to which the VEC is nearest. If a vehicle is neither RDV or RAV (e.g., RMV in some examples), then the VEC may ignore the vehicle, if notified of the vehicle, or may not even be notified of the vehicle.

At 1608, the VEC may determine whether the vehicle status is RAV (resource available vehicle). If so, the process goes to 1609. If not, the process goes to 1610.

At 1609, when the vehicle status is RAV, the VEC may add the vehicle information to a queue for accessing resources on the vehicle at the designated time t. For example, the VEC may try to expand its computing resources in some examples by utilizing nearby RAV vehicles for their available computing resources.

At 1610, the VEC may determine infrastructure and/or other sensor requirements based on the vehicle FOV, the POZ, and the vehicle path on the road segment corresponding to the POZ for which the vehicle requires assistance. For example, the VEC may list the vehicle ID as a potential candidate requiring support with computational resources for realizing automated driving on the road segment at time t. Once the VEC list the vehicle ID as a potential candidate to support at time t, the VEC identifies the region of interest (the uncovered region) where the vehicle needs extra sensor data (e.g., from infrastructure sensors, from sensors of other vehicles, or the like) to identify obstacles and road features to realize autonomous driving along the road segment. Note that the region of interest can be determined by comparing the FOV of the vehicle's onboard sensors with the POZ of the road segment. The VEC identifies necessary sensor data availability using infrastructure of other nearby vehicle data. The VEC may also perform identification of obstacles and road features for the calculated region of interest (the uncovered region) and may send the calculated perception result, as well as path planning information, to the vehicle. Alternatively, as another example, the VEC may send the raw sensor data from the infrastructure or other vehicles for the region of interest to the vehicle for processing onboard the vehicle if the vehicle has sufficient computing resources available on board the vehicle.

At 1612, the VEC may determine a $\Delta t$ considering real-time traffic information and historic traffic database of traffic traveling along the road segment. For example, the travel time of the connected vehicle from its current location to the VEC's nearest road segments might vary due to several uncertainties, such as traffic, weather, time of the day, etc. The VEC may determine an updated travel time for the vehicle to the VEC's nearest road segment(s) from the vehicle's current location considering data in the traffic history database, real-time traffic information, weather, etc.

At 1614, the VEC may determine the VEC load and computational capacity at time $t\pm\Delta t$ while also taking into consideration requests for providing services to other vehicles already received. For example, the VEC may calculate the overall computing requirement for the road segments (one VEC can be used to support a plurality of nearest road segments). Further, the VEC may connect with a number of connected vehicle data management platforms operated by different organizations and/or service providers. Thus, the VEC determines its total computing load considering requests from multiple sources and based on the available resources at time t.

At 1616, the VEC may determine whether the VEC has the computational capacity to process data for the vehicle at the time t. If so, the process goes to 1618. If not, the process goes to 1620.

At 1618, the VEC may send a reply confirming that resource capacity is available for the vehicle and may add the vehicle ID to a queue for performing processing at the time t. For example, if the VEC has available computing resources to support the overall computing requirement for a RDV at time t, the VEC may confirm with the data management platform at the service computing devices 108 that the VEC will support the vehicle during traversal of the road segment(s).

At 1620, the VEC may send a reply indicating that resource capacity is not available for the vehicle. For example, if sufficient resources are not available, the VEC will decline the request to support the RDV for the corresponding road segment(s). Based on the feedback from the VEC for the vehicle, the service computing device 108 may update the route of the vehicle to indicate that the road segment is not an autonomous driving segment. The process of updating the route will continue until the vehicle arrives at its destination.

Figure 17:
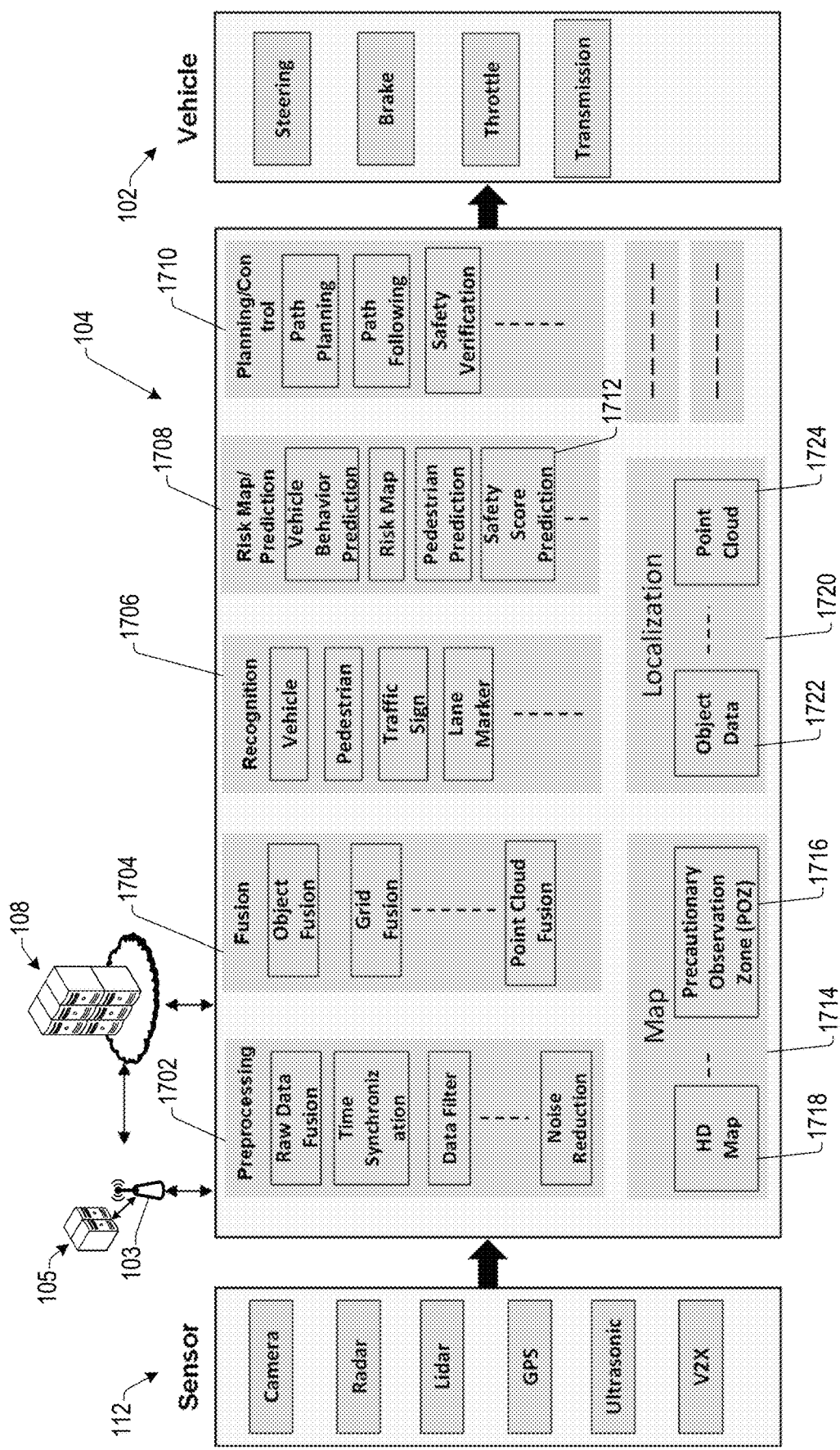
FIG. 17 illustrates an example schematic diagram of an autonomous driving control architecture according to some implementations.

FIG. 17 illustrates an example schematic diagram of an autonomous driving control architecture 1700 according to some implementations. In this example, the vehicle computing device(s) 104 discussed above with respect to FIG. 1 may include an AD ECU that may perform a plurality of different functions, such as data preprocessing 1702, fusion 1704, recognition 1706, risk map/prediction 1708, planning/control 1710, and so forth. For example, the data preprocessing 1702 may include raw data fusion, time synchronization, data filtering, noise reduction and so forth. The fusion 1704 may include object fusion, grid fusion, point cloud fusion, and the like. The recognition 1706 may include vehicle recognition, pedestrian recognition, traffic sign recognition, lane marker recognition, and so forth. The risk map/prediction 1708 may include vehicle behavior prediction, risk map generation, pedestrian prediction, and safety score prediction 1712. Furthermore, the planning/control 1710 may include path planning, path following, and safety verification.

The vehicle computing devices 104 may receive sensor information from a plurality of sensors 112 such as a camera, radar, lidar, GPS, ultrasonic, and V2X sensor information. In addition, based at least in part on the safety score prediction 1712, the vehicle computing device 104 may control one or more components of the vehicle 102, such as steering, brakes, throttle, transmission, and the like.

In some examples, in an automated vehicle where the in-vehicle sensors are sufficient to cover a POZ, the vehicle computing device(s) 104 may control the vehicle by executing the vehicle control program 524 inside of an AD ECU that may be included in the vehicle computing devices 104. In some cases, the roadside VEC 105 may also include an automated driving controller (e.g., may have the same capabilities as the AD ECU). If the VEC 105 has sufficient sensor coverage (e.g., infrastructure sensor data or other vehicle sensor data) to cover the entire POZ of a related road segment, as well as sufficient computing resources, the VEC 105 may utilize the automated driving control architecture, as shown in FIG. 17, to send the vehicle control signals to the vehicle 102 for controlling the vehicle components for navigation of the vehicle 102 on the road segment.

Alternatively, in the case that the VEC 105 does not have sufficient sensor data to cover the entire POZ, but only the coverage for the region needed by the vehicle, VEC may utilize the preprocessing modules 1702 of the automated control architecture and send the recognition results or recognition features to the vehicle AD ECU included in the vehicle computing devices 104. The AD ECU onboard the vehicle 102 can utilize the recognition results and/or features for sensor fusion, and may identify the obstacles, road features, road anomalies, etc., that may ultimately be used for generating vehicle control signals. As another example, based on the computing requirements and available resources, the VEC 105 and the in-vehicle AD ECU may share functions (fusion, recognition, risk map prediction, localization, etc.) or other subfunctions performed to calculate the vehicle control signals for controlling the vehicle 102.

Additionally, execution of required functions or subfunctions for the automated driving controller can be defined by the POZ also. For example, in the case where the vehicle is traversing a stretch of road between two intersections, there is no need to activate the pedestrian prediction motion algorithm under the risk map/prediction 1708. Thus, based on the POZ of a road segment, the VEC 105 (or the data management platform on the service computing devices 108) may identify the functions and may consecutively optimize the actions required for automated driving of the vehicle 102.

In some examples, the POZ may be used to reduce/optimize the number of sensors being used by the vehicle based on the vehicle's location. Moreover, the POZ can help to optimize the number of prediction modules to execute and the amount of sensor data to process, such as for conserving processing power which in turn can improve the vehicle efficiency. For example, in the case where the vehicle is traveling between two intersections, it may not be necessary for the vehicle to execute a pedestrian prediction motion algorithm. Numerous additional advantages and variations will be apparent to those of skill in the art having the benefit of the disclosure herein.

Furthermore, in some examples, the POZs may be calculated in the risk map/prediction 1708 as part of the safety score prediction 1712. The vehicle computing device 104 may store map data 1714 that may include the calculated POZs 1716, as well as other map data such as an HD map 1718. The map data 1714 may be updated by the data analytics platform executed in the cloud on the service computing devices 108 and/or by VECs 105. Furthermore, the vehicle computing device 104 may store localization data 1720 such as object data 1722 and point cloud data 1724.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, the implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Various instructions, processes, and techniques described herein may be considered in the general context of computer-executable instructions, such as computer programs and applications stored on computer-readable media, and executed by the processor(s) herein. Generally, the terms program and application may be used interchangeably, and may include instructions, routines, modules, objects, components, data structures, executable code, etc., for performing particular tasks or implementing particular data types. These programs, applications, and the like, may be executed as native code or may be downloaded and executed, such as in a virtual machine or other just-in-time compilation execution environment. Typically, the functionality of the programs and applications may be combined or distributed as desired in various implementations. An implementation of these programs, applications, and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed:
1. A system comprising:
one or more processors; and
one or more non-transitory computer-readable media including instructions executable by the one or more processors to configure the one or more processors to perform operations comprising:
determining a plurality of candidate routes between a source location for a vehicle and a destination location for the vehicle;
segmenting each candidate route of the plurality of candidate routes into multiple road segments;
receiving vehicle sensor configuration information for vehicle sensors onboard the vehicle;
determining that at least one of a field of view of the vehicle sensors on board the vehicle, or computing resources on board the vehicle fails to satisfy a threshold associated with autonomous navigation of a road segment of a first candidate route of the plurality of candidate routes; and
selecting, for the vehicle, the first candidate route based at least on determining that a computing device external to the vehicle is scheduled to perform at least one computational task for the vehicle to enable the vehicle to satisfy the threshold associated with autonomously navigating the road segment of the first candidate route.

2. The system as recited in claim 1, wherein the at least one computational task includes accessing sensor data from at least one sensor at the road segment and providing the vehicle with a result of processing the sensor data in real time as the vehicle traverses the road segment.

3. The system as recited in claim 2, wherein the at least one sensor at the road segment is at least one of an infrastructure sensor positioned at the road segment, or a vehicle sensor mounted on another vehicle traversing the road segment.

4. The system as recited in claim 1, wherein the operation of determining that at least one of the field of view of the vehicle sensors on board the vehicle, or the computing resources on board the vehicle fails to satisfy the threshold associated with autonomous navigation of the road segment further comprises:
 determining an observation zone volume for the road segment; and
 comparing an overlap of the field of view of the vehicle sensors with the observation zone volume to determine that a part of the observation zone is uncovered by the overlap of the field of view of the vehicle sensors.

5. The system as recited in claim 4, the operations further comprising:
 sending, to the computing device, information related to the uncovered part of the observation zone; and
 receiving from the computing device an indication that the computing device is able to access sensor data from at least one sensor associated with the road segment to provide information to the vehicle for the uncovered part of the observation zone.

6. The system as recited in claim 1, the operations further comprising providing the first candidate route to the vehicle based at least on determining that an amount of autonomous driving available to the vehicle during traversal of the first candidate route exceeds that of other candidate routes of the plurality of candidate routes.

7. The system as recited in claim 1, the operations further comprising:
 sending, to the computing device, an indication that the computing resources on board the vehicle fail to satisfy the threshold associated with autonomous navigation of the road segment; and
 receiving, from the computing device, an indication that the computing device has scheduled one or more computing resources to provide to the vehicle to assist the vehicle in autonomous navigation of the road segment at a timing based on a predicted time that the vehicle is predicted to traverse the road segment.

8. A computing device comprising:
 one or more processors configured by executable instructions to perform operations comprising:
  receive, from a service computing device, first vehicle information related to a first vehicle including a first time at which the first vehicle is predicted to traverse a road segment with which the computing device is associated;
  based on determining that the first vehicle has at least one of sensing resources or computing resources that fail to satisfy a first threshold level associated with autonomous navigation of the road segment, determining that a computational load on the computing device at the first time is below a second threshold;
  sending, to the service computing device, an indication that the computing device is scheduled to perform at least one computational task for assisting the first vehicle to autonomously navigate the road segment; and
  based on detecting that the first vehicle has reached the road segment, providing a result of the computational task to the first vehicle.

9. The computing device as recited in claim 8, the operations further comprising:
 receiving, from the service computing device, information related to a second vehicle including a second time at which the second vehicle is predicted to traverse the road segment;
 based on determining that the second vehicle has resources that exceed a second threshold level associated with autonomous navigation of the road segment, and that the second time is within a threshold of the first time, receiving, from the second vehicle, information based on at least one sensor on board the second vehicle; and
 sending, to the first vehicle, a processing result based on the information based on the at least one sensor on board the second vehicle.

10. The computing device as recited in claim 8, the operations further comprising:
 receiving, by the computing device, from the first vehicle, sensor information received by the first vehicle from a plurality of sensors on board the first vehicle;
 performing, by the computing device, recognition processing on the received first vehicle sensor information; and
 sending, by the computing device, to the first vehicle, based on a result of the recognition processing, at least one control signal that controls at least one system on board the first vehicle.

11. The computing device as recited in claim 8, the operations further comprising:
 receiving, by the computing device, from a plurality of sensors associated with the road segment, sensor information related to the road segment;
 performing, by the computing device, recognition processing on the received sensor information; and
 sending, by the computing device, to the first vehicle, based on a result of the recognition processing, at least one control signal that controls at least one system on board the first vehicle.

12. The computing device as recited in claim 8, the operation of determining that the first vehicle has resources below a first threshold level associated with autonomous navigation of the road segment comprises:
 determining an observation zone volume for the road segment; and
 comparing an overlap of the field of view of the vehicle sensors of the first vehicle with the observation zone volume to determine that a part of the observation zone is uncovered by the overlap of the field of view of the vehicle sensors.

13. The computing device as recited in claim 12, the operations further comprising:
 identifying at least one sensor associated with the road segment that can provide information related to the part of the observation zone that is uncovered by the overlap; and
 sending, to the first vehicle a processing result based on the information from the at least one sensor associated with the road segment.

14. The computing device as recited in claim 12, the operations further comprising:

identifying at least one sensor associated with the road segment that can provide information related to the part of the observation zone that is uncovered by the overlap; and sending, to the first vehicle, raw sensor data received from the at least one sensor associated with the road segment.

\* \* \* \* \*